(12) United States Patent
Kosaka

(10) Patent No.: US 10,651,562 B2
(45) Date of Patent: May 12, 2020

(54) FREQUENCY SELECTIVE SURFACE, ANTENNA, WIRELESS COMMUNICATION DEVICE, AND RADAR DEVICE

(71) Applicant: NEC Corporation, Minato-ku, Tokyo (JP)

(72) Inventor: Keishi Kosaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/077,130

(22) PCT Filed: Feb. 13, 2017

(86) PCT No.: PCT/JP2017/005081
§ 371 (c)(1),
(2) Date: Aug. 10, 2018

(87) PCT Pub. No.: WO2017/141856
PCT Pub. Date: Aug. 24, 2017

(65) Prior Publication Data
US 2019/0036225 A1  Jan. 31, 2019

(30) Foreign Application Priority Data
Feb. 18, 2016 (JP) .................. 2016-028552

(51) Int. Cl.
*H01Q 15/00* (2006.01)
*H01Q 7/00* (2006.01)
(Continued)

(52) U.S. Cl.
CPC .......... *H01Q 15/0026* (2013.01); *G01S 7/03* (2013.01); *H01Q 7/00* (2013.01); *G01S 7/023* (2013.01); *H01Q 1/42* (2013.01); *H01Q 21/061* (2013.01)

(58) Field of Classification Search
CPC ......... H01Q 15/0026; H01Q 7/00; G01S 7/03
(Continued)

(56) References Cited

U.S. PATENT DOCUMENTS

2003/0034917 A1* 2/2003 Nishizawa ............... H01Q 1/38
343/700 MS
2006/0170606 A1* 8/2006 Yamagajo .......... G06K 19/0726
343/803

(Continued)

FOREIGN PATENT DOCUMENTS

| JP | 2003-060430 A | 2/2003 |
| JP | 2009-218966 A | 9/2009 |

(Continued)

OTHER PUBLICATIONS

International Search Report for PCT Application No. PCT/JP2017/005081, dated May 9, 2017.

(Continued)

*Primary Examiner* — Lam T Mai

(57) ABSTRACT

In order to implement a frequency selective plate designable in any shape and size; and an antenna, a wireless communication device, and a radar device including a frequency selective plate designable in any shape and size, a frequency selective plate according to the present invention is a frequency selective plate for transmitting an electromagnetic wave of a predetermined frequency, and reflecting an electromagnetic wave of a frequency other than the predetermined frequency. The frequency selective plate includes at least one or more conductive closed loops configured in such a way that a conductive pattern formed on one layer, and a conductive pattern to be formed on at least one layer different from the one layer are electrically connected by a connecting portion.

19 Claims, 34 Drawing Sheets

(51) Int. Cl.
  *H01Q 1/42* (2006.01)
  *G01S 7/03* (2006.01)
  *G01S 7/02* (2006.01)
  *H01Q 21/06* (2006.01)

(58) Field of Classification Search
  USPC .................. 343/834, 700 MS, 853, 904, 803
  See application file for complete search history.

(56) References Cited

U.S. PATENT DOCUMENTS

| | | | | |
|---|---|---|---|---|
| 2006/0170607 | A1* | 8/2006 | Yamagajo | G06K 19/0726 343/803 |
| 2010/0052821 | A1* | 3/2010 | Kushta | H01P 1/047 333/204 |
| 2010/0097272 | A1* | 4/2010 | Kim | H01Q 1/243 343/700 MS |
| 2011/0037676 | A1* | 2/2011 | Kobayashi | H01Q 1/243 343/853 |
| 2012/0286900 | A1* | 11/2012 | Kadota | H03H 9/02559 333/188 |
| 2015/0214631 | A1 | 7/2015 | Yukimasa | |
| 2015/0357702 | A1* | 12/2015 | Tani | H01Q 5/321 343/904 |
| 2016/0231417 | A1* | 8/2016 | Aoki | G01S 13/931 |
| 2019/0246498 | A1* | 8/2019 | Numagi | H04N 5/2253 |

FOREIGN PATENT DOCUMENTS

| | | |
|---|---|---|
| JP | 2011-217269 A | 10/2011 |
| JP | 2012-257084 A | 12/2012 |

OTHER PUBLICATIONS

English translation of Written opinion for PCT Application No. PCT/JP2017/005081.

* cited by examiner

FREQUENCY SELECTIVE SURFACE, ANTENNA, WIRELESS COMMUNICATION DEVICE, AND RADAR DEVICE

This application is a National Stage Entry of PCT/JP2017/005081 filed on Feb. 13, 2017, which claims priority from Japanese Patent Application 2016-028552 filed on Feb. 18, 2016, the contents of all of which are incorporated herein by reference, in their entirety.

TECHNICAL FIELD

The present invention relates to a frequency selective plate, an antenna, a wireless communication device, and a radar device.

BACKGROUND ART

In recent years, a metamaterial technique of controlling propagation characteristics of an electromagnetic wave by periodically disposing a conductive pattern having a specific structure has been proposed. In particular, a technique of "a frequency selective plate (or a frequency selective surface)" of controlling transmittance characteristics and reflection characteristics of an incident electromagnetic wave by periodically disposing a specific conductive pattern as a minimum unit cell in a two-dimensional manner is paid attention to. A frequency selective plate is also referred to as a frequency selective sheet/surface (FSS), and application thereof to a reflection plate of an antenna and a radome of a radar device is expected.

PTL 1 describes an antenna device including a frequency selective plate in which a ring-shaped conductive pattern is periodically disposed, on a back surface of an antenna. The frequency selective plate described in PTL 1 reflects an electromagnetic wave only at an antenna operating frequency, and transmits an electromagnetic wave of another frequency band. Therefore, it is possible to reduce a radar cross-section (RCS) in a band other than the antenna operating frequency.

Further, PTL 2 discloses a configuration including a frequency selective plate in which metal pieces are periodically disposed, on a front surface of an array antenna, or a configuration in which holes are periodically formed in a metal plate. The frequency selective plate described in PTL 2 is able to transmit an electromagnetic wave only at an antenna operating frequency, reflect an electromagnetic wave of another frequency band, and therefore reduce radiation of an unwanted frequency from an array antenna.

CITATION LIST

Patent Literature

[PTL 1] Japanese Unexamined Patent Application Publication No. 2011-217269
[PTL 2] Japanese Unexamined Patent Application Publication No. 2003-60430

SUMMARY OF INVENTION

Technical Problem

As described in PTL 1 and PTL 2, it is desirable to be able to design a frequency selective plate in any shape and size in terms of size and design of a device, when the frequency selective plate is employed as a reflection plate of an antenna, a radome, and the like.

However, in the frequency selective plate illustrated in FIG. 1 of PTL 1, ring-shaped elements are periodically disposed, and it is necessary to make an outer periphery of the ring-shaped element equal to a length of one wavelength associated with an operating frequency. Therefore, an outer peripheral size of a minimum unit cell constituting a frequency selective plate does not become shorter than a length of one wavelength associated with an operating frequency.

An object of the present invention is to provide a frequency selective plate designable in any shape and size; and an antenna, a wireless communication device, and a radar device including a frequency selective plate designable in any shape and size.

Solution to Problem

In order to achieve the above-described object, a frequency selective plate according to the present invention is a frequency selective plate for transmitting an electromagnetic wave of a predetermined frequency, and reflecting an electromagnetic wave of a frequency other than the predetermined frequency. The frequency selective plate includes at least one or more conductive closed loops configured in such a way that a conductive pattern formed on one layer, and a conductive pattern to be formed on at least one layer different from the one layer are electrically connected by a connecting portion.

In order to achieve the above-described object, an antenna according to the present invention is configured in such a way that at least a part of a radome covering at least one antenna element is a frequency selective plate including at least one or more conductive closed loops configured in such a way that a conductive pattern formed on one layer, and a conductive pattern to be formed on at least one layer different from the one layer are electrically connected by a connecting portion, and being configured to transmit an electromagnetic wave of a predetermined frequency, and reflect an electromagnetic wave of a frequency other than the predetermined frequency.

In order to achieve the above-described object, a wireless device according to the present invention includes an antenna and a wireless communication circuit, the antenna being configured in such a way that at least a part of a radome covering at least one antenna element is a frequency selective plate including at least one or more conductive closed loops configured in such a way that a conductive pattern formed on one layer, and a conductive pattern to be formed on at least one layer different from the one layer are electrically connected by a connecting portion, and being configured to transmit an electromagnetic wave of a predetermined frequency, and reflect an electromagnetic wave of a frequency other than the predetermined frequency.

In order to achieve the above-described object, a wireless device according to the present invention includes an antenna and a radar electronic circuit, the antenna being configured in such a way that at least a part of a radome covering at least one antenna element is a frequency selective plate including at least one or more conductive closed loops configured in such a way that a conductive pattern formed on one layer, and a conductive pattern to be formed on at least one layer different from the one layer are electrically connected by a connecting portion, and being configured to transmit an electromagnetic wave of a predetermined frequency, and reflect an electromagnetic wave of a frequency other than the predetermined frequency.

Advantageous Effects of Invention

According to the present invention, it becomes possible to provide a frequency selective plate designable in any shape and size; and an antenna, a wireless communication device, and a radar device including a frequency selective plate designable in any shape and size.

EXAMPLE EMBODIMENT

First Example Embodiment

Figure 1:
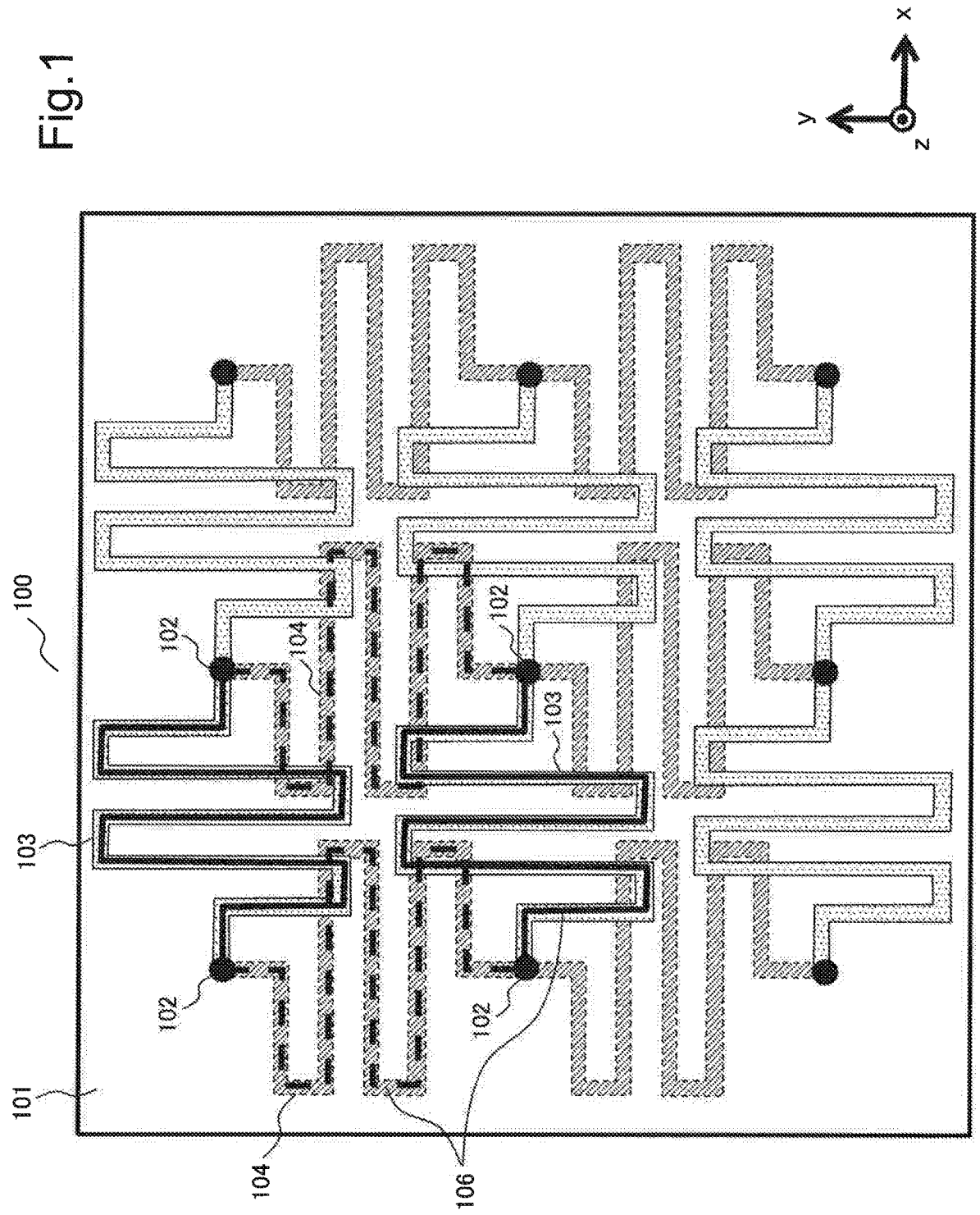
FIG. 1 is a diagram illustrating a configuration example of a first example embodiment.

Next, an example embodiment of the present invention is described in detail with reference to FIG. 1 to FIG. 8.
[Description on Configuration]
FIG. 1 is a top plan view illustrating a configuration of a frequency selective plate 100 in a first example embodiment. Further, FIG. 2 is a front view illustrating a configuration of the frequency selective plate 100 in the first example embodiment.

Figure 2:
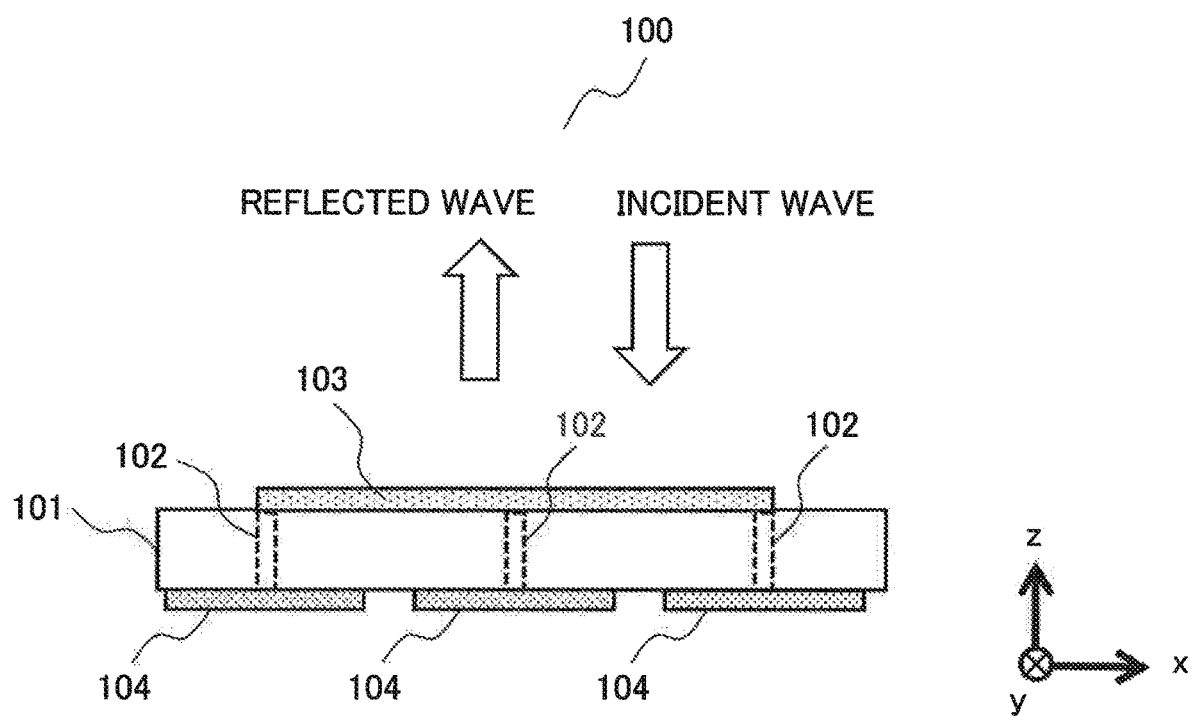
FIG. 2 is a diagram illustrating a configuration example of the first example embodiment.

In FIG. 1 and FIG. 2, for description, an X-axis and a Y-axis are defined in a planar direction of a plate surface of a dielectric substrate 101 to be described later, and a Z-axis is defined in a vertical direction (normal direction) of the plate surface of the dielectric substrate 101. Further, also in other drawings, an X-axis, a Y-axis, and a Z-axis are defined as necessary.

As illustrated in FIG. 1 and FIG. 2, the frequency selective plate 100 includes the dielectric substrate 101, and a plurality of conductive vias 102 which are substantially periodically disposed in a two-dimensional manner through the dielectric substrate 101. Further, the frequency selective plate 100 includes a layer-shaped conductive pattern 103 disposed on one surface of the dielectric substrate 101, and configured to electrically connect two conductive vias 102 adjacent to each other in the X-axis direction in the drawings. Further, the frequency selective plate 100 includes a layer-shaped conductive pattern 104 disposed on a surface of the dielectric substrate 101 opposite to the surface where the conductive pattern 103 is formed, and configured to electrically connect two conductive vias 102 adjacent to each other in the Y-axis direction in the drawings.

The conductive pattern 103 and the conductive pattern 104 have a meander shape such that patterns are disposed at positions perpendicular to each other as illustrated in FIG. 1.

Herein, a conductive loop 106 constituted by two conductive patterns 103 and two conductive patterns 104 for connecting four conductive vias 102, and formed on both surfaces of the dielectric substrate 101 is illustrated by solid lines and dotted lines.

The conductive loop 106 is a minimum unit cell by which the frequency selective plate 100 is operated, and hereinafter is referred to as an operating unit cell.

Note that the conductive vias 102, and the conductive patterns 103 and 104 (further, in the following description, members described as conductive members) are made of a metal such as copper, silver, aluminum, and nickel, or any other material having good conductivity, for example. The dielectric substrate 101 may be a printed substrate employing glass epoxy resin, for example. Alternatively, the dielectric substrate 101 may be an interposer substrate such as a large-scale integration (LSI), may be a module substrate made of a ceramic material such as low temperature co-fired ceramic (LTCC), or may be a semiconductor substrate such as silicon.

Further, the frequency selective plate 100 is producible by an ordinary production process of a substrate such as a printed substrate and a semiconductor substrate.

Further, generally, the conductive via 102 is formed by applying plating to a through-hole formed in the dielectric substrate 101 by a drilling machine. Alternatively, any method may be employed, as far as it is possible to electrically connect between layers. For example, a laser via to be formed by a laser may be employed, or a copper wire and the like may be employed.

Further, the dielectric substrate 101 may be an air layer (hollow layer). Further, the dielectric substrate 101 may be constituted only by a partially dielectric support member, with at least a part thereof being hollow.

Further, generally, the conductive patterns 103 and 104 are formed by a sheet metal, or a copper film attached to a dielectric substrate. Alternatively, the conductive patterns 103 and 104 may be made of any other material, as far as the conductive patterns 103 and 104 have conductivity.

[Description on Operation]

Next, an operation of the present example embodiment is described with reference to FIG. 1 and FIG. 2.

In FIG. 1, a conductive loop 106 constituted by two conductive patterns 103 and two conductive patterns 104 for connecting four conductive vias 102, and formed on both surfaces of the dielectric substrate 101 is illustrated by solid lines and dotted lines.

When a frequency of an electromagnetic wave incident to the frequency selective plate 100 in the Z-axis direction, and a resonant frequency of the conductive loop 106 coincide with each other, or are frequencies close to each other, the conductive loop 106 is excited, and re-radiation occurs. Therefore, when an electromagnetic wave is incident to the frequency selective plate 100, the electromagnetic wave transmits toward a side opposite to the frequency selective plate 100. Further, when a frequency of an electromagnetic wave incident to the frequency selective plate 100 is different from a resonant frequency of the conductive loop 106, the electromagnetic wave is reflected on the frequency selective plate 100, since the conductive loop 106 is not excited.

A resonant frequency of the conductive loop 106 resonates when a circumferential electrical length of a loop and a wavelength of an electromagnetic wave substantially coincide with each other. Therefore, a resonant frequency of a loop is determined by determining a shape of the loop.

Further, in the frequency selective plate 100 of the present example embodiment, as illustrated in FIG. 1 and FIG. 2, the conductive loop 106 is formed by a conductive pattern formed on both surfaces of the dielectric substrate 101. Further, the frequency selective plate 100 is disposed in such a way that orthogonal projections of the conductive patterns 103 and 104 with respect to one surface of a dielectric substrate partially overlap. A layout that parts of orthogonal projections overlap as described above cannot be implemented when a conductive pattern is formed on one surface. By forming a conductive pattern on both surfaces of a dielectric substrate as described above, and further forming in such a way that orthogonal projections of two conductive patterns with respect to one surface of the dielectric substrate partially overlap, an outer periphery of the conductive loop 106 becomes shorter than a length of one wavelength of an electromagnetic wave in an operating frequency band. Consequently, miniaturization of an operating unit cell is implemented.

Note that even when the conductive loop 106 is formed on one surface of the dielectric substrate 101, and a conductive pattern forming the conductive loop has a meander shape, an outer periphery of the conductive loop 106 becomes shorter than a length of one wavelength of an electromagnetic wave in an operating frequency band. In this way, even when the conductive loop 106 is formed on one surface of the dielectric substrate 101, and a conductive pattern forming the conductive loop has a meander shape, miniaturization of an operating unit cell is implemented. Further, even when a conductive pattern does not have a meander shape, and has a winding shape other than a meander shape, miniaturization of an operating unit cell is implemented.

As described above, forming a conductive pattern on both surfaces, partially overlapping orthogonal projections of two conductive patterns with respect to one surface of a dielectric substrate, and forming a meander shape individually or mutually act, and miniaturization of a conductive loop is implemented, while retaining an electrical length. Specifically, a physical size of an operating unit cell is shortened. Since miniaturization of an operating unit cell described above is accomplished by improvement on a physical shape of a conductive loop and a conductive pattern, it is less likely that an outer periphery of an operating unit cell depends on a wavelength of an electromagnetic wave in an operating frequency band.

In other words, regarding an operating unit cell of a frequency selective plate in the present example embodiment, it is not required to make an outer peripheral size of the operating unit cell equal to a length of one wavelength associated with the operating frequency, unlike an operating unit cell of a frequency selective plate illustrated in FIG. 1 of the above-described PTL 1. Therefore, it is possible to make the operating unit cell in the present example embodiment smaller than the operating unit cell illustrated in FIG. 1 of PTL 1.

As described above, it is possible to design the frequency selective plate 100 in the present example embodiment in any shape and size by miniaturization of an operating unit cell, as compared with a frequency selective plate described in PTL 1.

Note that the frequency selective plate 100 in the present example embodiment is constituted by a plurality of operating unit cells. Alternatively, the frequency selective plate 100 may be constituted by one operating unit cell depending on application of a frequency selective plate.

Modification Examples of First Example Embodiment

Figure 3:
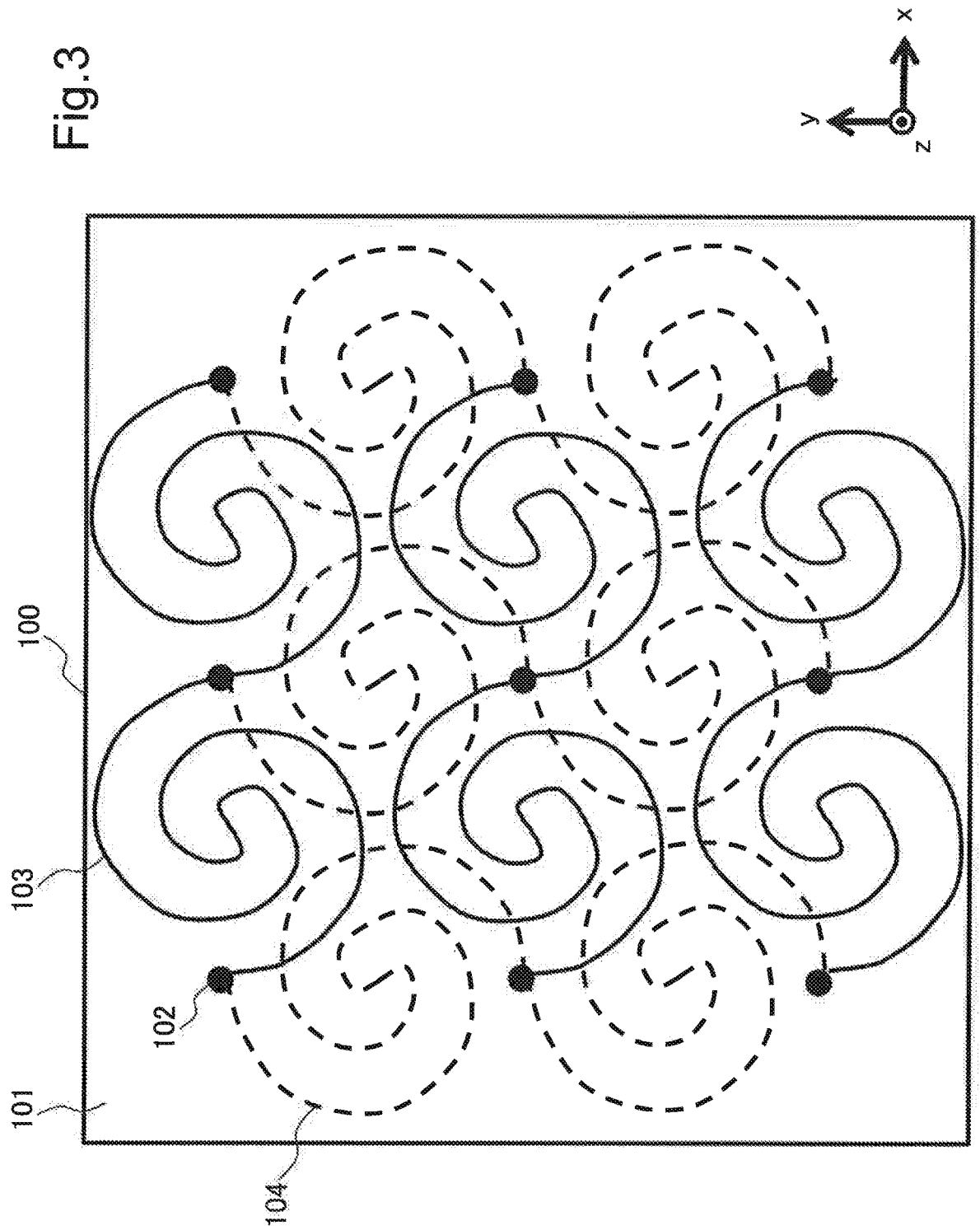
FIG. 3 is a diagram illustrating a modification example of the first example embodiment.
Figure 4:
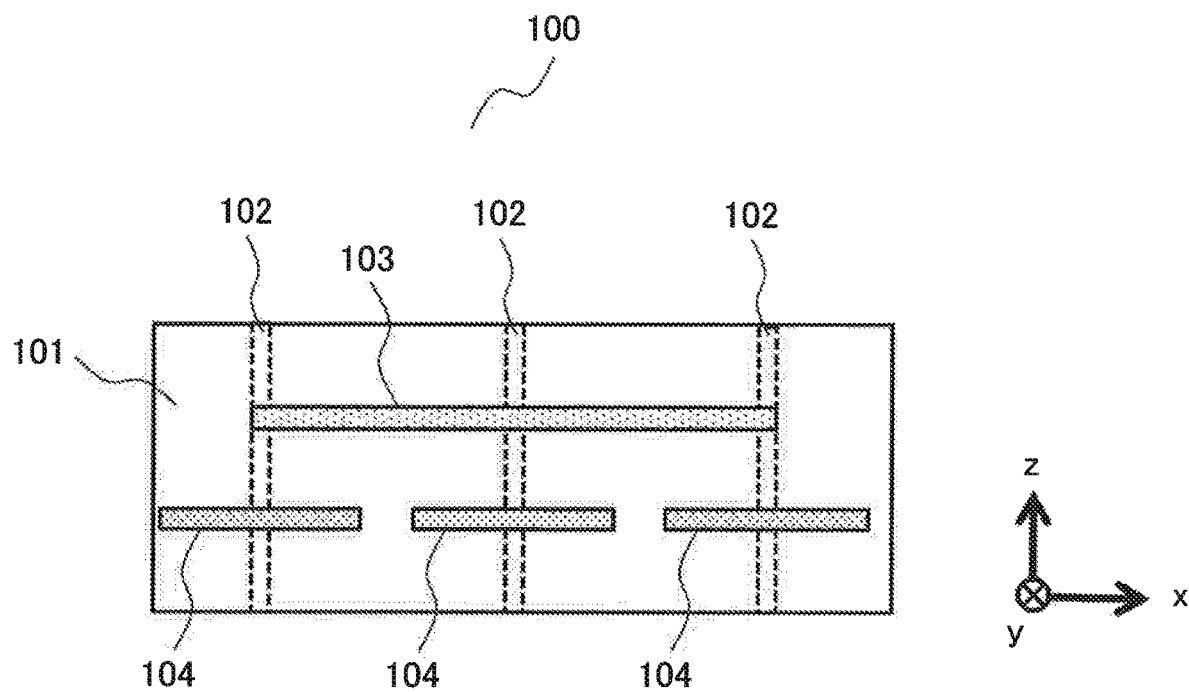
FIG. 4 is a diagram illustrating a modification example of the first example embodiment.
Figure 5:
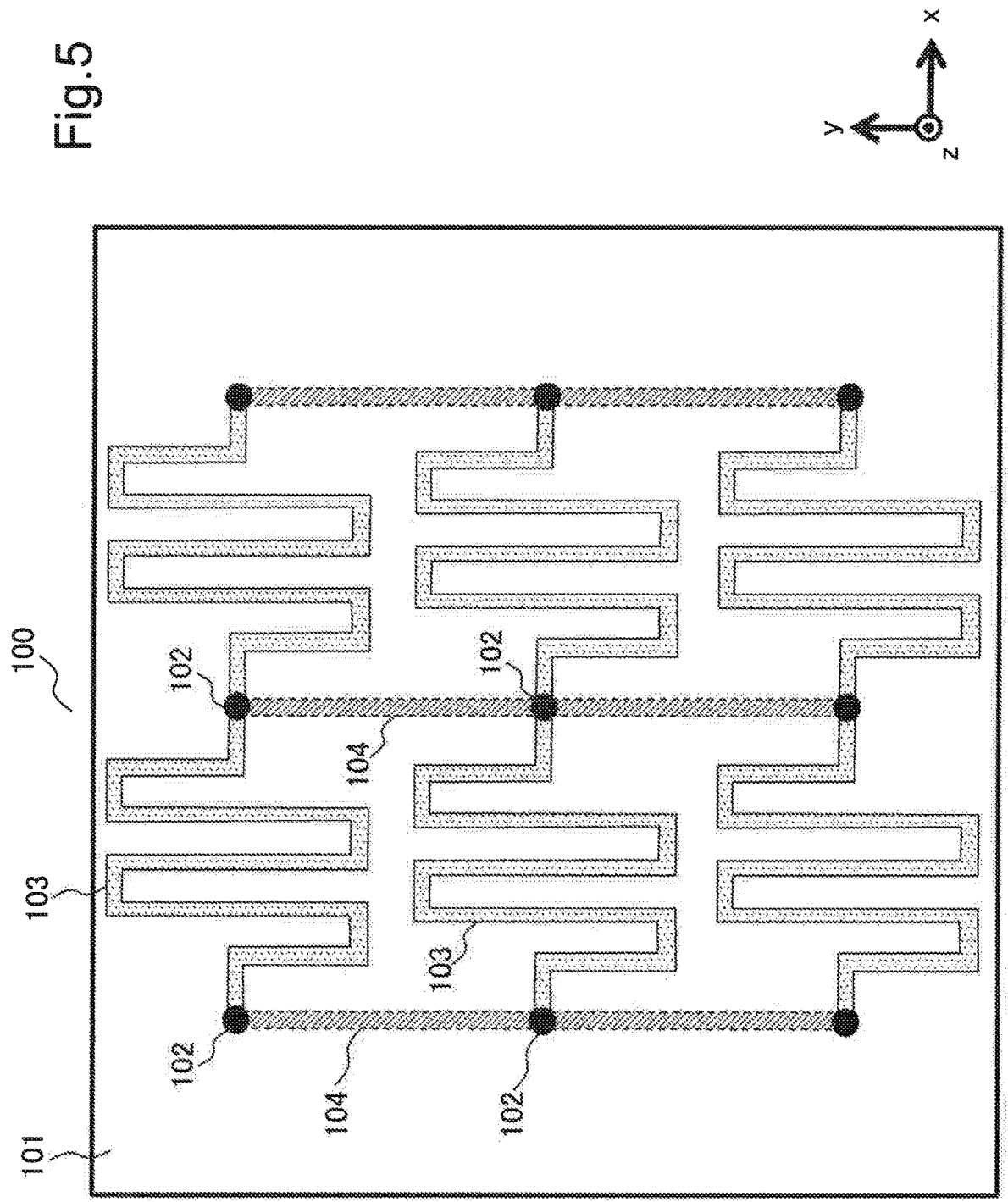
FIG. 5 is a diagram illustrating a modification example of the first example embodiment.

Modification examples of the frequency selective plate 100 in the first example embodiment are illustrated in FIG. 3, FIG. 4, and FIG. 5.

In FIG. 1, the conductive patterns 103 and 104 have a meander shape. However, the shape of the conductive patterns 103 and 104 is not limited to the above. As far as end portions of two conductive vias 102 adjacent to each other are electrically connected, and further, as far as an electrical length is effectively long for miniaturization of an operating unit cell, the conductive patterns 103 and 104 may have any shape. For example, as illustrated in FIG. 3, a conductive pattern may have a scroll shape.

Further, in FIG. 2, the conductive patterns 103 and 104 are respectively formed on a layer of an outer surface of the dielectric substrate 101. As illustrated in FIG. 4, conductive patterns 103 and 104 may be respectively formed on different inner layers of a dielectric substrate 101. In this case, an effective relative dielectric constant of peripheries of the conductive patterns 103 and 104 becomes high, as compared with a case where the conductive patterns 103 and 104 are formed on an outer surface of the dielectric substrate 101. Therefore, since an effective electrical length of conductive patterns 103 and 104 becomes longer than a case where conductive patterns 103 and 104 are formed on an outer surface of a dielectric substrate 101, it is possible to miniaturize an operating unit cell.

Further, in FIG. 1, the conductive pattern 103 and the conductive pattern 104 have a meander shape such that electrical lengths thereof are equal to each other. As illustrated in FIG. 5, electrical lengths of conductive patterns 103 and 104 may be different from each other. In this way, in a case where electrical lengths of the conductive pattern 103 and the conductive pattern 104 are different from each other, transmittance and reflection characteristics of an electromagnetic wave incident to the frequency selective plate 100 differ depending on polarization. In a case of the frequency selective plate 100 illustrated in FIG. 5, since an electrical length of the conductive pattern 103 is longer than that of the conductive pattern 104, a transmittance frequency of an incident electromagnetic wave having an electric field vector in the X-axis direction is lower than a transmittance frequency of an incident electromagnetic wave having an electric field vector in the Y-axis direction.

Figure 6:
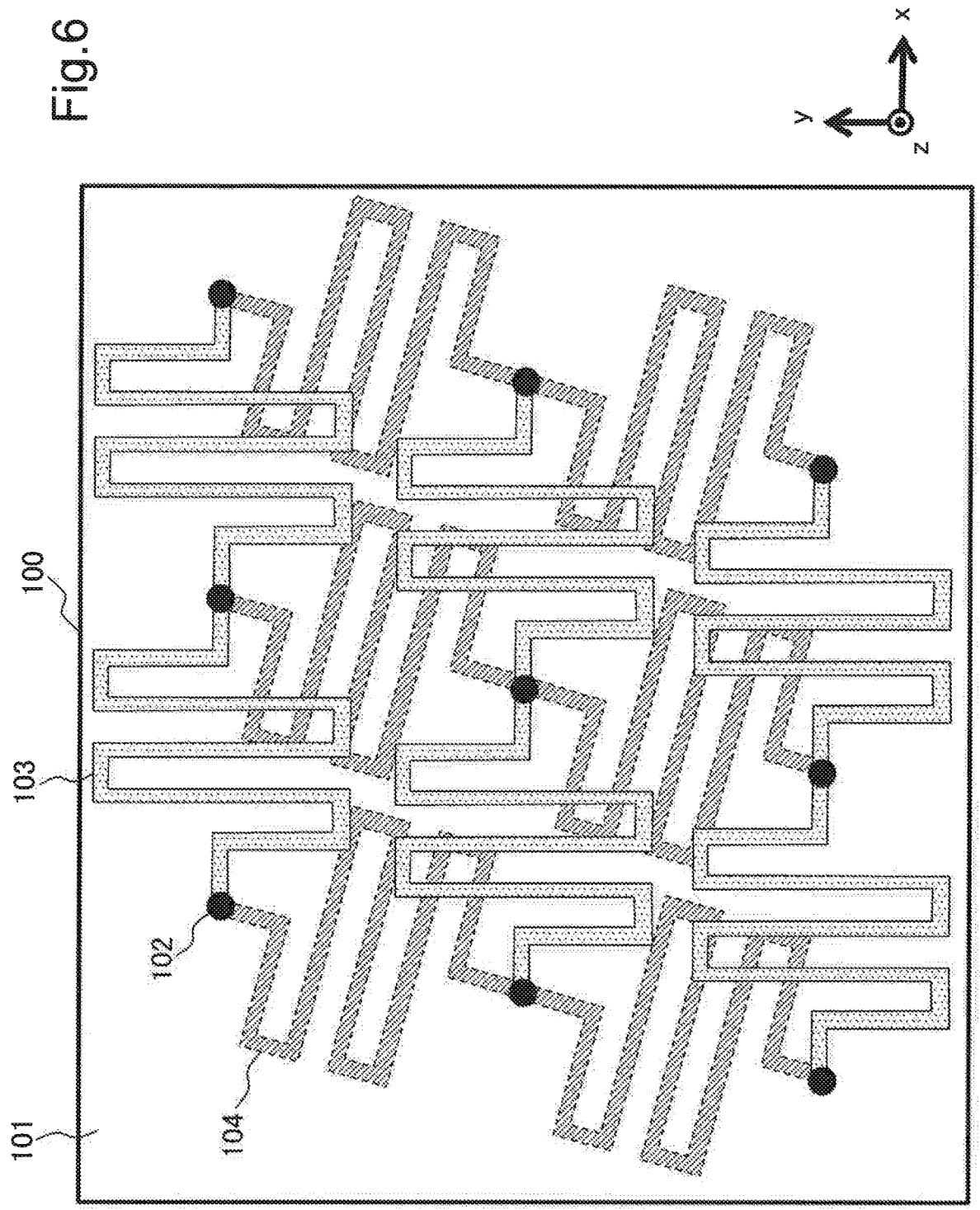
FIG. 6 is a diagram illustrating a modification example of the first example embodiment.

Further, in FIG. 1, the conductive vias 102 are periodically disposed in a two-dimensional square array. However, as far as a desired characteristic is satisfied, conductive vias may be disposed in any two-dimensional shape. For example, as illustrated in FIG. 6, conductive vias 102 may be disposed in a parallelogram array.

Figure 7:
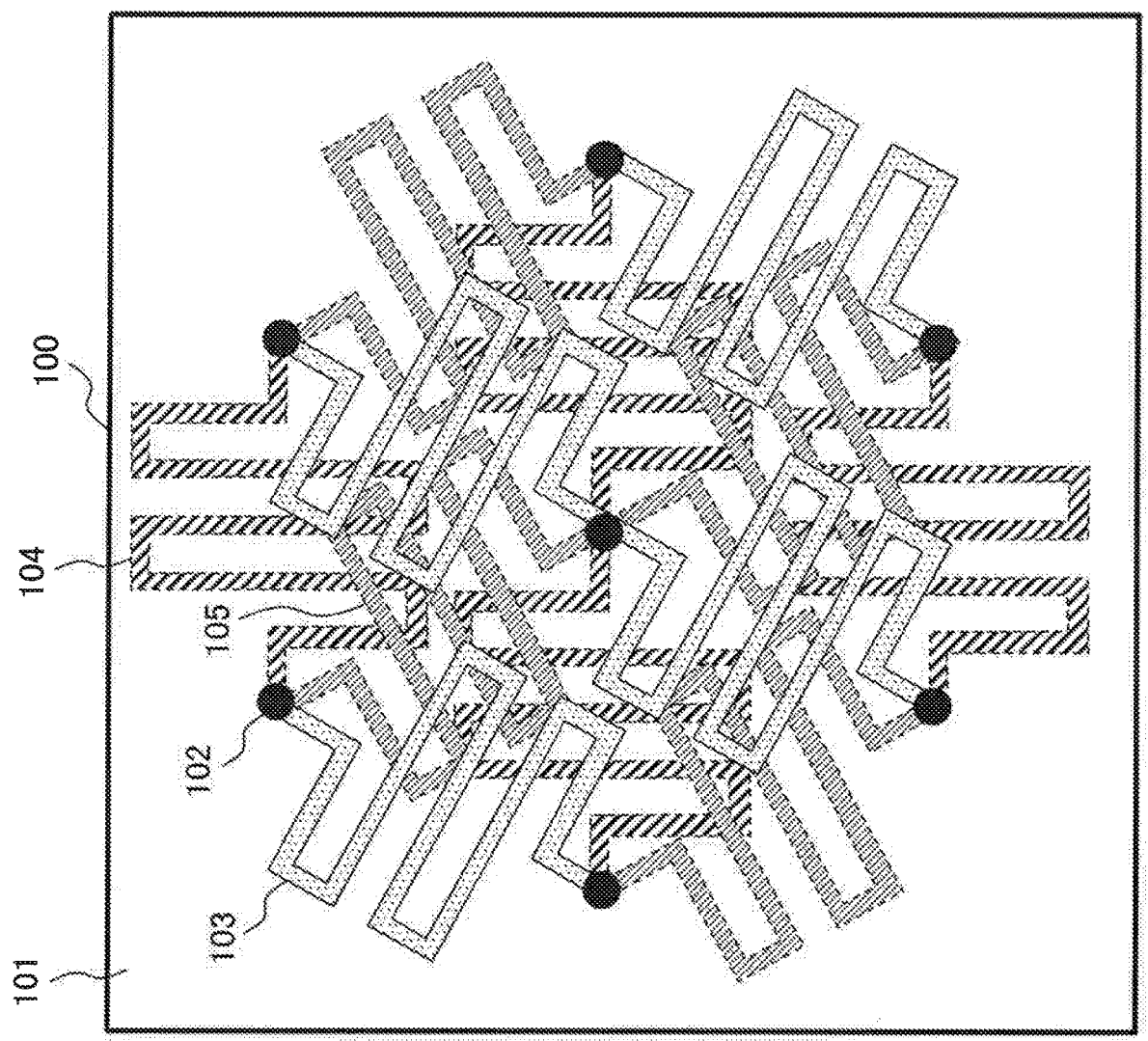
FIG. 7 is a diagram illustrating a modification example of the first example embodiment.
Figure 8:
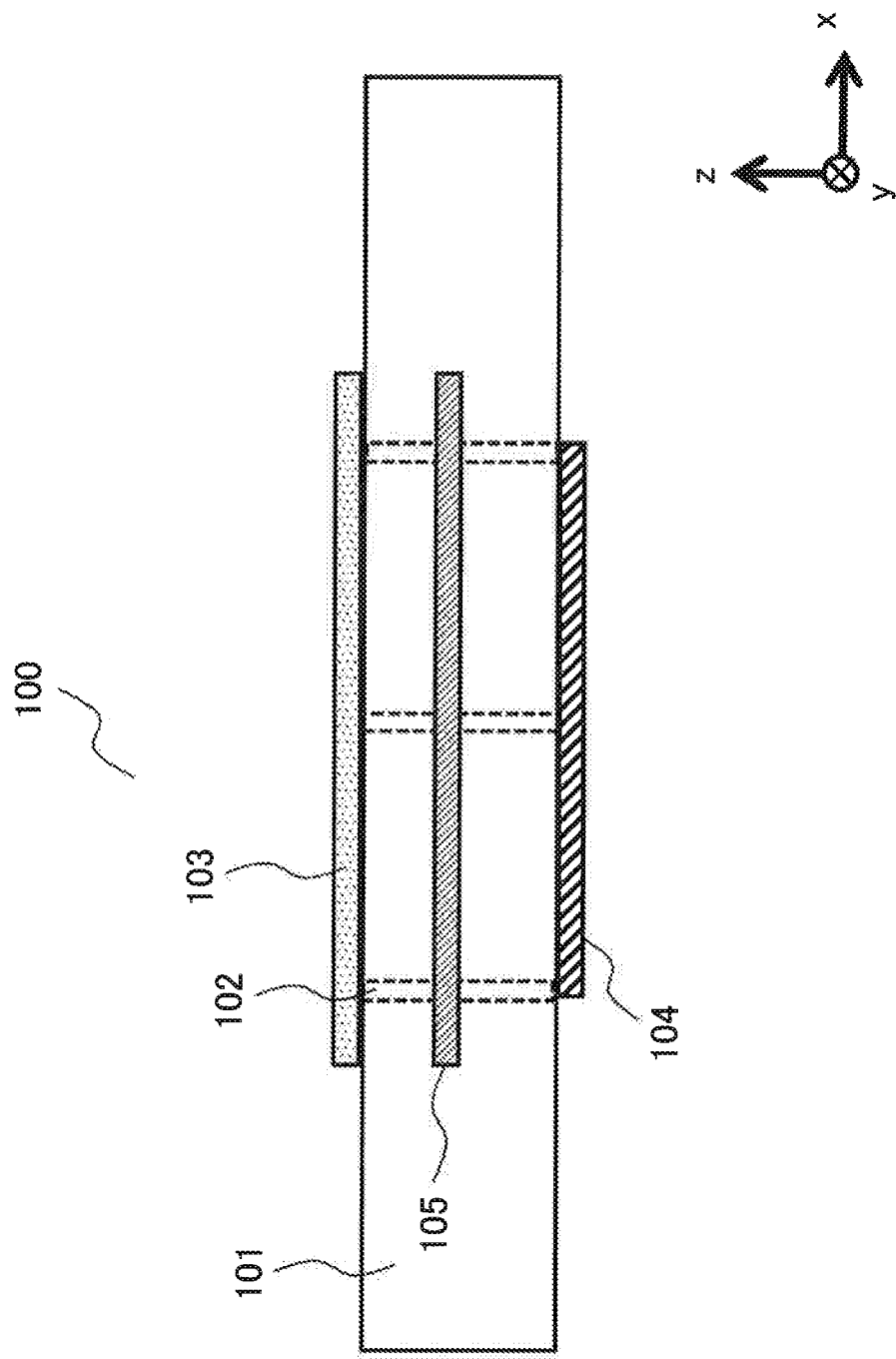
FIG. 8 is a diagram illustrating a modification example of the first example embodiment.

Further, as illustrated in FIG. 7 and FIG. 8, conductive vias 102 may be two-dimensionally and periodically disposed in a triangular pattern. Further, conductive vias adjacent to each other in three directions within a plane including the X-axis and the Y-axis may be respectively electrically connected by conductive patterns 103, 104, and 105. Herein, the conductive pattern 105 is newly added. Alternatively, as illustrated in FIG. 8, the conductive pattern 105 may be disposed on an intermediate layer of the dielectric substrate 101.

Second Example Embodiment

Next, a second example embodiment is described with reference to FIG. 10, FIG. 11, and FIG. 12. Note that constituent elements similar to the above-described first example embodiment are indicated with same reference numbers, and description thereof is omitted as necessary.
[Description on Configuration]

Figure 10:
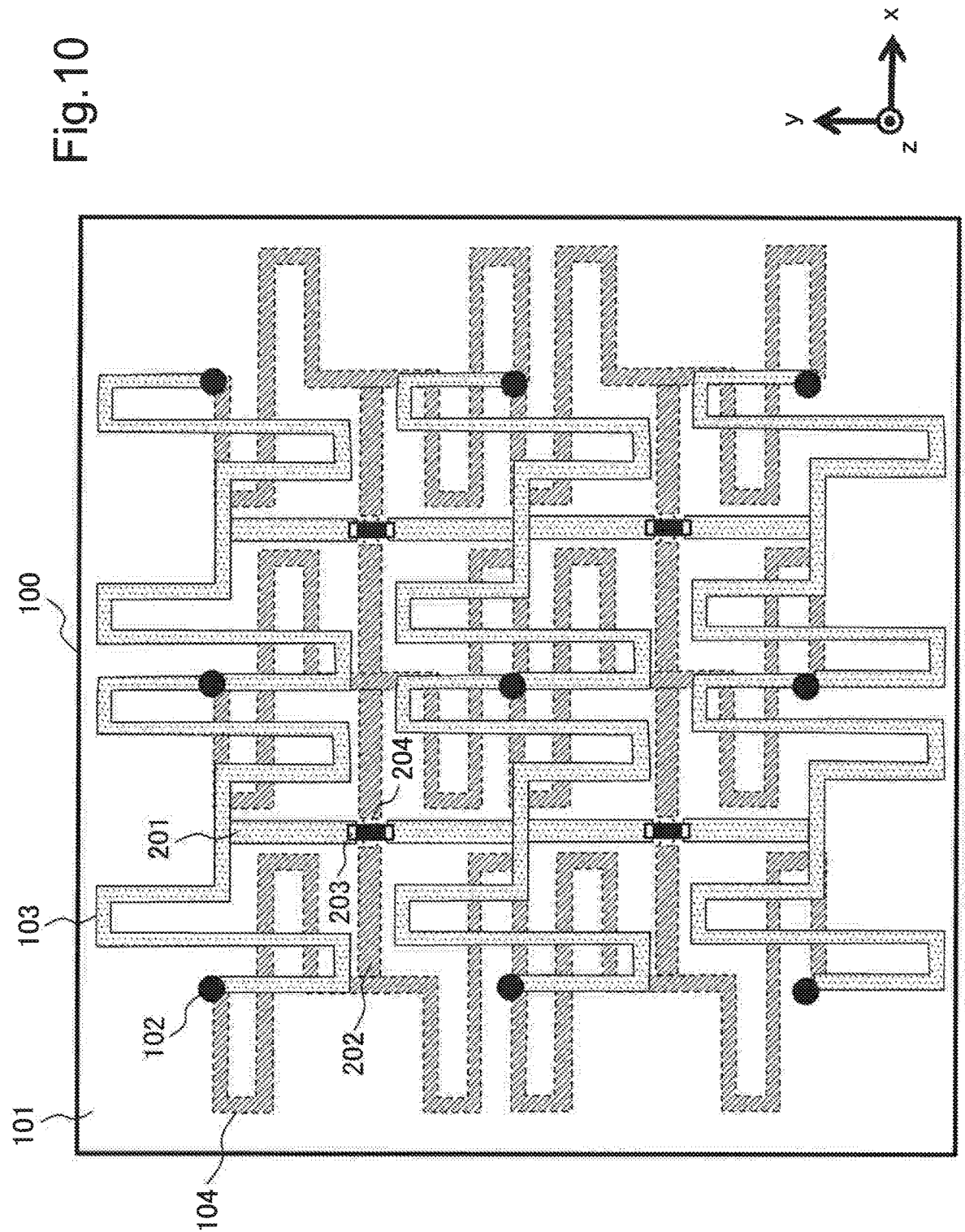
FIG. 10 is a diagram illustrating a configuration example of a second example embodiment.

FIG. 10 is a top plan view illustrating a configuration of a frequency selective plate 100 in the second example embodiment. Further, FIG. 11 is a front view illustrating a configuration of the frequency selective plate 100 in the second example embodiment.

Figure 11:
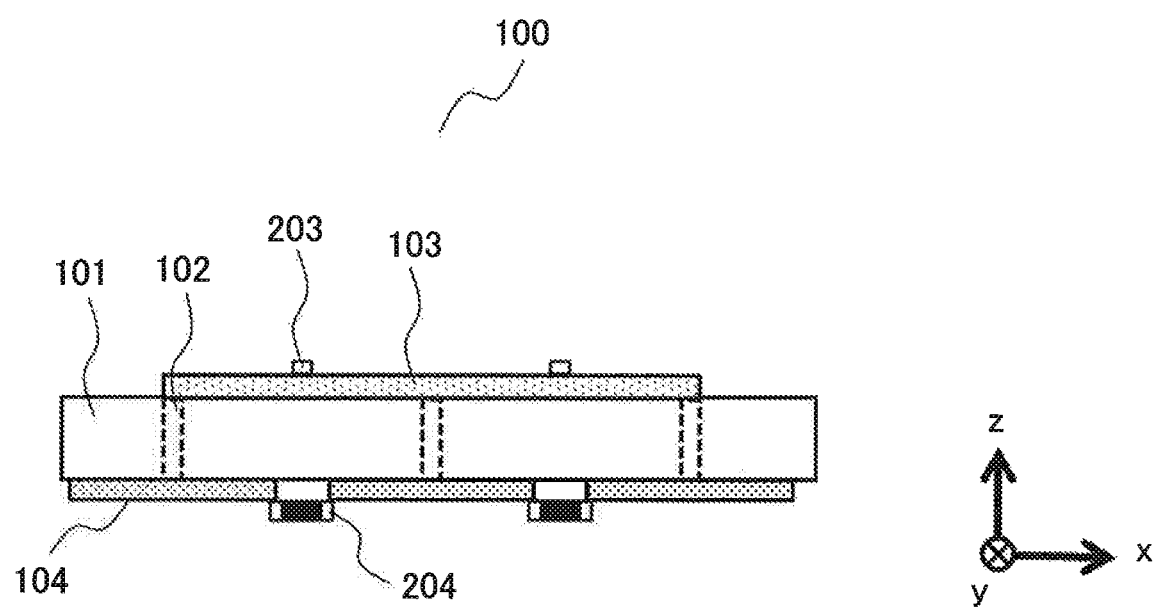
FIG. 11 is a diagram illustrating a configuration example of the second example embodiment.

The frequency selective plate 100 illustrated in FIG. 10 and FIG. 11 includes a branch conductive pattern 201 branched from a conductive pattern 103 and respectively extending in a plus direction and a minus direction of a Y-axis. Further, the frequency selective plate 100 includes a branch conductive pattern 202 branched from a conductive pattern 104, and respectively extending in a plus direction and a minus direction of an X-axis.

Further, the frequency selective plate 100 includes a capacitor 203 connected between end portions of the two branch conductive patterns 201 adjacent to each other with a gap being interposed in the Y-axis direction. Further, the frequency selective plate 100 includes a capacitor 204 connected between end portions of the two branch conductive patterns 202 adjacent to each other with a gap being interposed in the X-axis direction. Other constituent elements are similar to the constituent elements in the first example embodiment.
[Description on Operation]

Next, an operation of the present example embodiment is described with reference to FIG. 10 and FIG. 11.

As described in description on an operation of the first example embodiment, an operating frequency of the frequency selective plate 100 depends on a resonant frequency that is determined by an electrical length of the conductive loop 106, which is constituted by four conductive vias 102 adjacent to each other, two conductive patterns 103, and two conductive patterns 104. The frequency selective plate 100 in the present example embodiment further includes the branch conductive pattern 201, the branch conductive pattern 202, the capacitor 203, and the capacitor 204. Further, since an electrical length of the conductive loop 106 is effectively increased by capacitances of the capacitor 203 and the capacitor 204, it is possible to shorten a physical size of the conductive loop 106.

In this way, in the frequency selective plate 100 of the present example embodiment, it is possible to miniaturize an operating unit cell, as compared with the frequency selective plate 100 described in the first example embodiment. Therefore, it is possible to implement a frequency selective plate in any shape and size, as compared with the first example embodiment.

Further, in the frequency selective plate 100 of the first example embodiment, it is required to change a shape of a conductive pattern for adjustment of an operating frequency. However, in the frequency selective plate 100 of the present example embodiment, it is possible to adjust an operating frequency of the frequency selective plate 100 by changing values of capacitances of the capacitor 203 and the capacitor 204. Therefore, in the frequency selective plate 100 of the present example embodiment, it becomes easy to adjust an operating frequency, as compared with the frequency selective plate 100 described in the first example embodiment.

Modification Example of Second Example Embodiment

Figure 12:
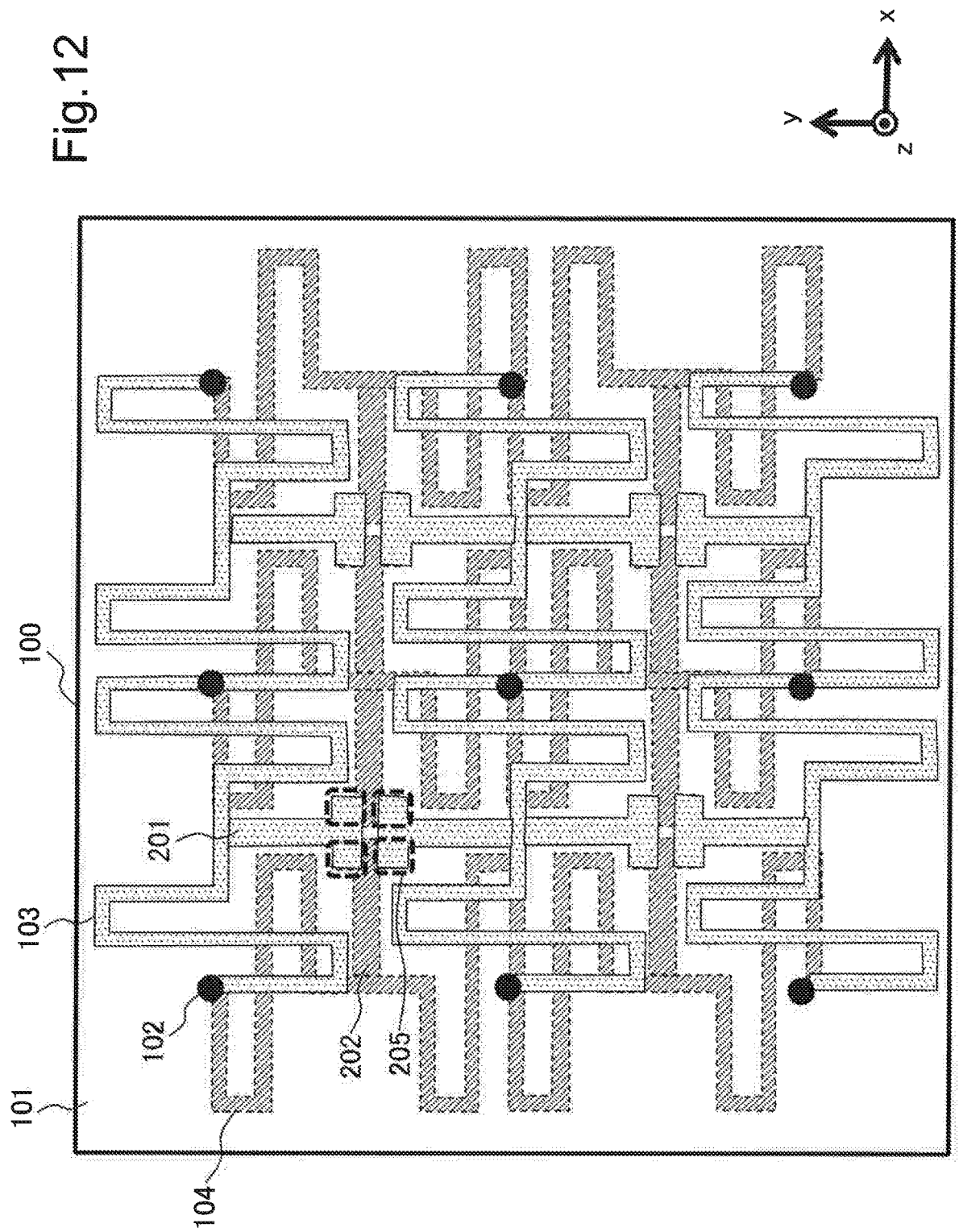
FIG. 12 is a diagram illustrating a modification example of the second example embodiment.

FIG. 12 illustrates a configuration of a modification example of the second example embodiment.

A frequency selective plate 100 illustrated in FIG. 12 does not include a capacitor 203 and a capacitor 204. Instead, a capacitance between end portions of a branch conductive pattern 201 adjacent to each other in the Y-axis direction, and a capacitance between end portions of a branch conductive pattern 202 adjacent to each other in the X-axis direction are respectively determined by shapes of the end portions of the branch conductive patterns 201 and 202. In this case, although freedom in adjustment of capacitance is not secured, as compared with a capacitor, unlike the frequency selective plate 100 illustrated in FIG. 10 and FIG. 11, it becomes possible to implement a capacitance element without employing a capacitor, and miniaturize an operating unit cell.

Further, as illustrated in FIG. 12, it is possible to design two branch conductive patterns 201 adjacent to each other, and two branch conductive patterns 202 adjacent to each other in such a way that an overlapping portion (an overlapping portion 205 in FIG. 12) is formed when viewed from the Z-axis direction by extending shapes of respective end portions adjacent to each other. In this way, by disposing branch conductive patterns 202 facing each other with the dielectric substrate 101 being interposed with respect to two branch conductive patterns 201 adjacent to each other, it becomes possible to increase a capacitance between the two branch conductive patterns 201. Likewise, by disposing branch conductive patterns 201 facing each other with the dielectric substrate 101 being interposed with respect to two branch conductive patterns 202 adjacent to each other, it becomes possible to increase a capacitance between the two branch conductive patterns 202.

Note that, in the frequency selective plates 100 illustrated in FIG. 10, FIG. 11, and FIG. 12, a capacitance is applied in each of the Y-axis direction by the branch conductive patterns 201 and the capacitor 203, and the X-axis direction by the branch conductive patterns 202 and the capacitor 204. However, it is needless to say that a capacitance may be applied only in one of the X-axis direction and the Y-axis direction. In this case, an operating frequency changes by polarization of an electromagnetic wave incident to the frequency selective plate 100, similarly to the frequency selective plate 100 in FIG. 5 according to the first example embodiment, and the like.

Further, in FIG. 10, FIG. 11, and FIG. 12, the above-described capacitance is disposed at a middle portion of four conductive vias 102 adjacent to each other, when viewed from the Z-axis direction. A position of a capacitance, however, is not limited to the above.

Third Example Embodiment

Next, a third example embodiment is described in detail with reference to FIG. 13 and FIG. 14. Note that constituent elements similar to the above-described first example embodiment are indicated with same reference numbers, and description thereof is omitted as necessary.

[Description on Configuration]

Figure 13:
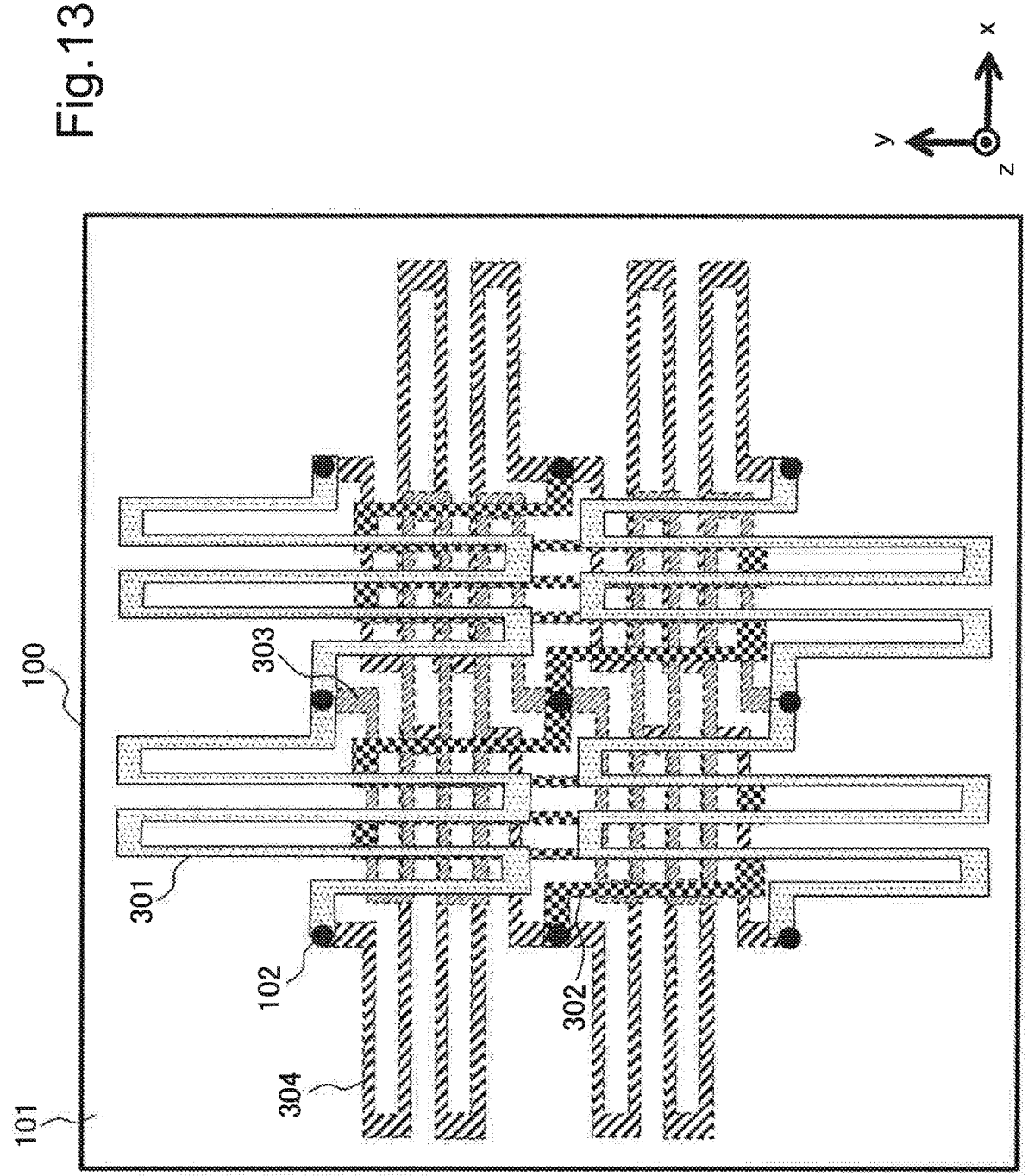
FIG. 13 is a diagram illustrating a configuration example of a third example embodiment.

FIG. 13 is a top plan view illustrating a configuration of a frequency selective plate 100 in the third example embodiment. Further, FIG. 14 is a cross-sectional view illustrating a configuration of the frequency selective plate 100 in the third example embodiment, when viewed from a front direction.

Figure 14:
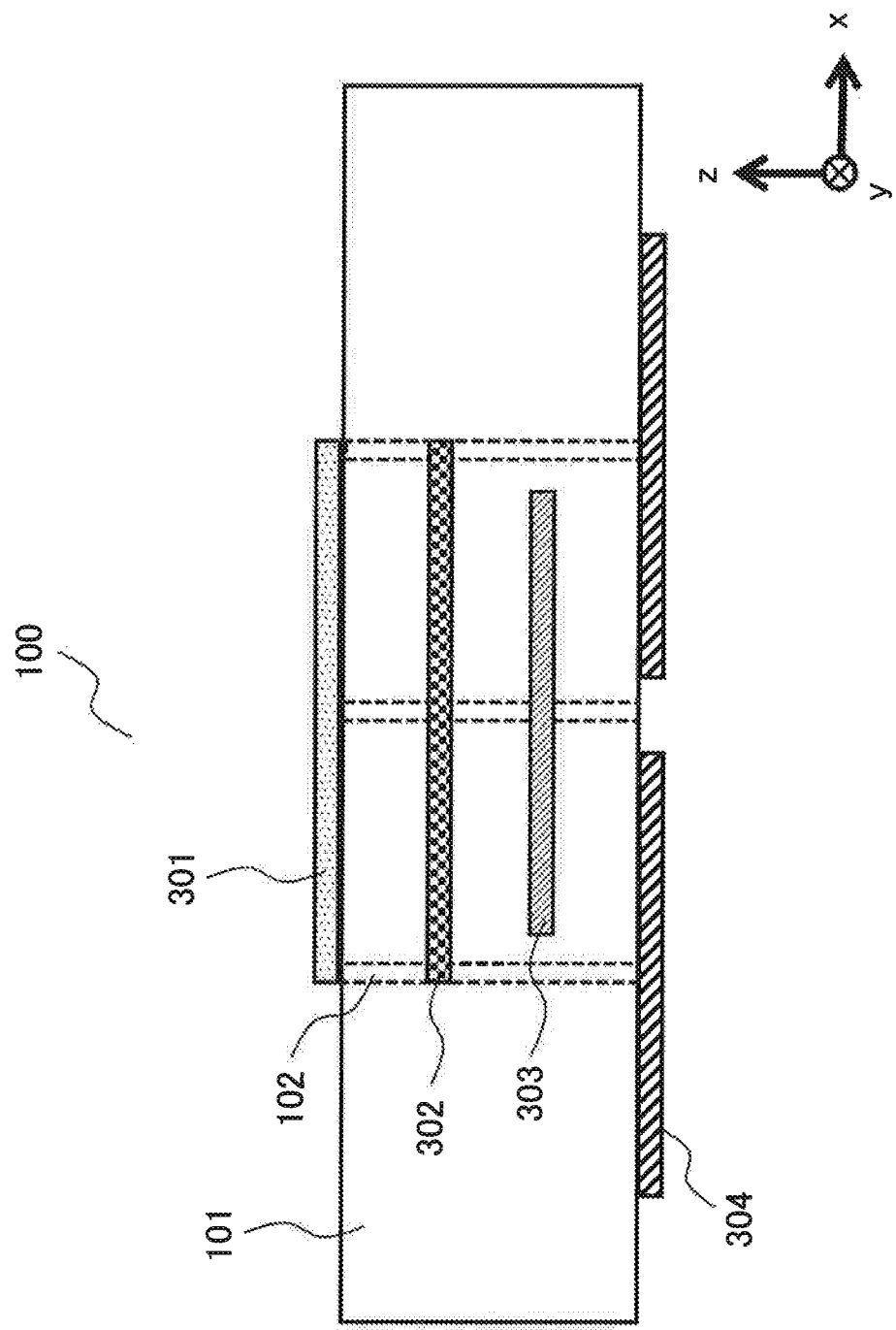
FIG. 14 is a diagram illustrating a configuration example of the third example embodiment.

The frequency selective plate 100 illustrated in FIG. 13 and FIG. 14 includes a conductive pattern 301 and a conductive pattern 302, in place of two conductive patterns 103 in the first example embodiment. Further, the conductive pattern 301 is disposed on an uppermost layer of a dielectric substrate 101 in a plus direction of a Z-axis, and the conductive pattern 302 is disposed on a second conductive layer, when it is assumed that the conductive pattern 301 is a first conductive layer of the dielectric substrate 101 in the plus direction of the Z-axis. Further, the conductive pattern 301 and the conductive pattern 302 are alternately disposed in a Y-axis direction at a position where the conductive pattern 103 is disposed in the first example embodiment.

Further, the frequency selective plate 100 includes a conductive pattern 304 and a conductive pattern 303, in place of two conductive patterns 104 in the first example embodiment. Further, the conductive pattern 304 is disposed on a lowermost layer of the dielectric substrate 101 in the plus direction of the Z-axis, and the conductive pattern 303 is disposed on a third conductive layer, when it is assumed that the conductive pattern 301 is a first conductive layer of the dielectric substrate 101 in the plus direction of the Z-axis. Further, the conductive pattern 304 and the conductive pattern 303 are alternately disposed in an X-axis direction at a position where the conductive pattern 104 is disposed in the first example embodiment.

Other constituent elements are similar to the constituent elements in the first example embodiment.

[Description on Operation]

Next, an operation of the present example embodiment is described with reference to FIG. 13 and FIG. 14.

As described in the first example embodiment, an operating frequency of the frequency selective plate 100 depends on a resonant frequency that is determined by an electrical length of the conductive loop 106. However, in the frequency selective plate 100 in FIG. 13 and FIG. 14, an electrical length of a conductive loop that determines an operating frequency is determined by shapes of the conductive patterns 301 to 304.

At this occasion, the conductive patterns 301 and 302 adjacent to each other in the Y-axis direction within the conductive loop 106 are different from two conductive patterns 103 in the frequency selective plate 100 of FIG. 1 described in the first example embodiment. Specifically, the conductive patterns 301 and 302 are not present on a same layer of the dielectric substrate 101, and therefore the conductive patterns 301 and 302 are able to have a meander shape in such a way that parts thereof overlap when viewed from the Z-axis direction. Likewise, the conductive patterns 303 and 304 are also able to have a meander shape in such a way that parts thereof overlap when viewed from the Z-axis direction.

In this way, the conductive loop 106 in the frequency selective plate 100 illustrated in FIG. 13 and FIG. 14 is able to form a loop by a meander shape of a longer length by using an area corresponding to four layers of the dielectric substrate 101. Therefore, as compared with a case where a conductive pattern is formed by two conductive layers as described in the first example embodiment, forming a conductive pattern by four conductive layers as described in the present example embodiment is advantageous in lowering a resonant frequency of the conductive loop 106. In other words, by forming a conductive pattern by four conductive layers, in place of two conductive layers, it is possible to shorten a physical size of an operating unit cell, while retaining an electrical length.

Consequently, as compared with a frequency selective plate described in the first example embodiment, it is possible to miniaturize an operating unit cell of the frequency selective plate 100. Therefore, it is possible to implement a frequency selective plate designable in any shape and size, as compared with a frequency selective plate described in the first example embodiment.

Note that it is needless to say that the conductive patterns 301 and 302 are not limited to a meander shape.

Further, it is also possible to form a dielectric substrate 101 of multiple layers, in place of forming a conductive pattern by four conductive layers, as illustrated in FIG. 13 and FIG. 14. In this case, a conductive pattern of three or more different layers may be formed in place of the conductive pattern 103 in the first example embodiment, and a conductive pattern of three or more different layers may be formed in place of the conductive pattern 104 in the first example embodiment, and these conductive patterns may be formed one over the other in order.

According to this configuration, respective conductive patterns are able to have a meander shape in a further broader area, while crossing over conductive patterns adjacent to each other when viewed from the Z-axis direction. Therefore, it becomes possible to further miniaturize an operating unit cell, as compared with an operating unit cell of the frequency selective plate 100 in FIG. 13 and FIG. 14. However, when the number of layers of the dielectric substrate 101 is increased, cost may increase.

Fourth Example Embodiment

Figure 15:
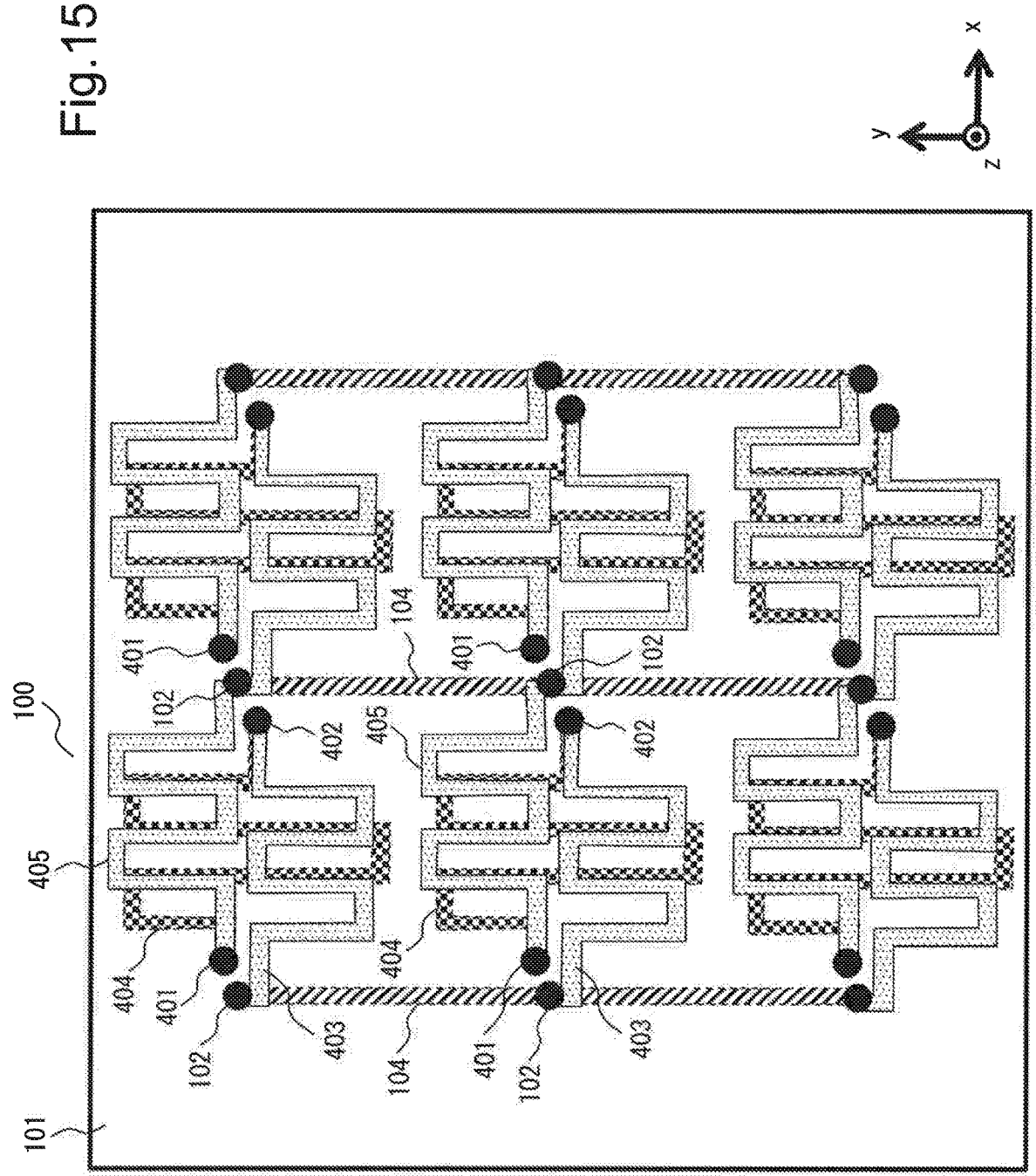
FIG. 15 is a diagram illustrating a configuration example of a fourth example embodiment.

Next, a fourth example embodiment is described with reference to FIG. 15, FIG. 16, and FIG. 17. Note that constituent elements similar to the above-described first example embodiment are indicated with same reference numbers, and description thereof is omitted as necessary.
[Description on Configuration]
FIG. 15 is a top plan view illustrating a configuration of a frequency selective plate 100 in the fourth example embodiment. Further, FIG. 16 is a cross-sectional view illustrating a configuration of the frequency selective plate 100 in the fourth example embodiment, when viewed from a front direction.

Figure 16:
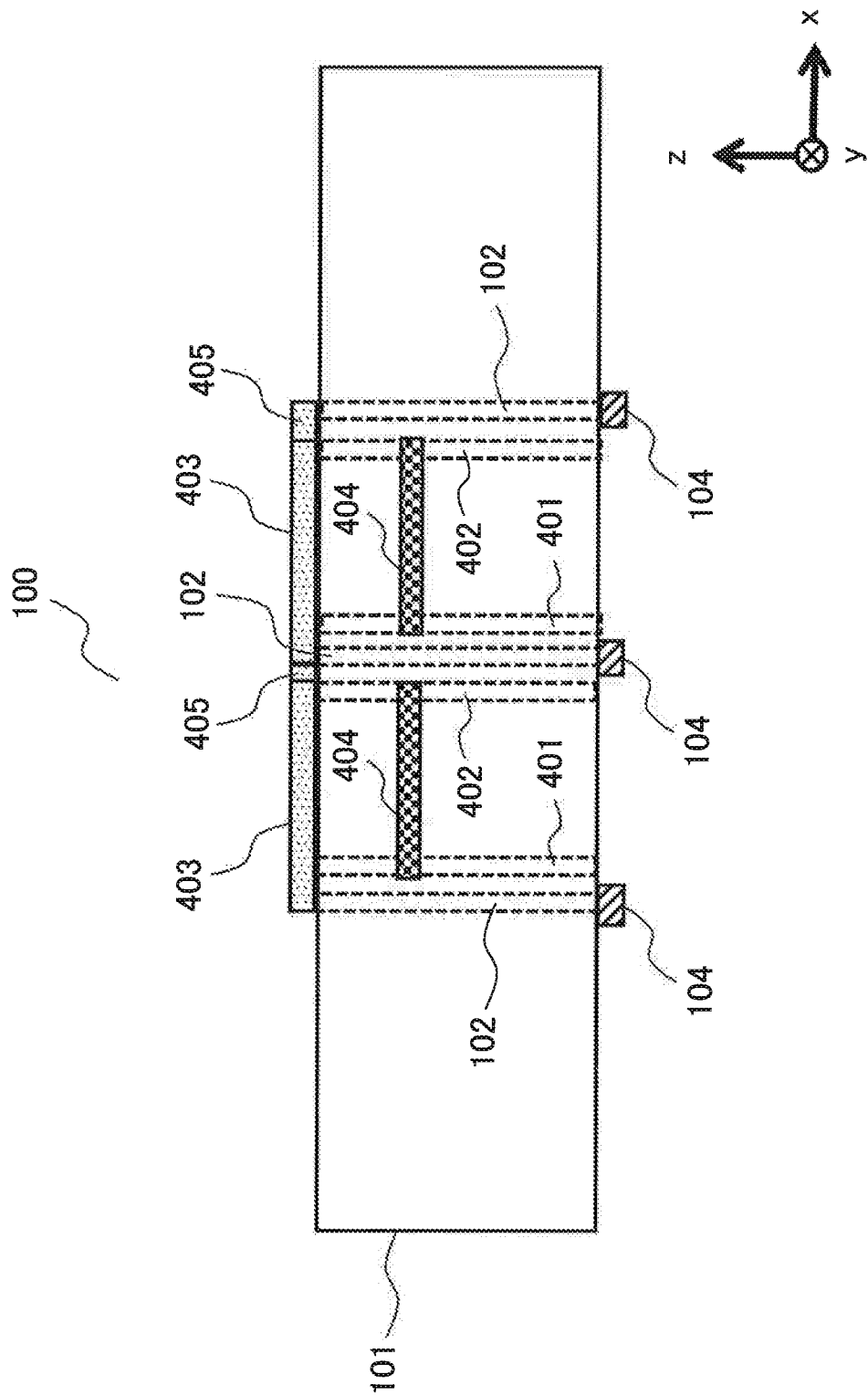
FIG. 16 is a diagram illustrating a configuration example of the fourth example embodiment.

As illustrated in FIG. 15 and FIG. 16, the frequency selective plate 100 includes conductive vias 401 and conductive vias 402 passing through a dielectric substrate 101, and disposed near conductive vias 102.

Further, the frequency selective plate 100 includes a conductive pattern 403 disposed on an uppermost layer of the dielectric substrate 101 in a plus direction of a Z-axis. The conductive pattern 403 electrically connects a conductive via 102, and a conductive via 402 disposed near another conductive via 102 adjacent to the conductive via 102 in a plus direction of an X-axis.

Further, the frequency selective plate 100 includes a conductive pattern 404 on an inner layer of the dielectric substrate 101. The conductive pattern 404 electrically connects a conductive via 402, and a conductive via 401 near another conductive via 102 adjacent to a conductive via 102 disposed near the conductive via 402 in a minus direction of the X-axis.

Further, the frequency selective plate 100 includes a conductive pattern 405 disposed on an uppermost layer of the dielectric substrate 101 in the plus direction of the Z-axis. The conductive pattern 405 electrically connects a conductive via 401, and another conductive via 102 adjacent to a conductive via 102 disposed near the conductive via 401 in the plus direction of the X-axis.

Further, the conductive patterns 403 to 405 connect between conductive vias 102 adjacent to each other in the X-axis direction by using two layers by a length corresponding to 1.5 times of a distance between the conductive vias 102, in place of the conductive pattern 103 described in the first example embodiment.

Note that, in FIG. 15 and FIG. 16, the conductive pattern 104 is formed on an outer surface of the dielectric substrate 101 in the minus direction of the Z-axis with a shape similar to the conductive pattern 104 of FIG. 5 described in a modification example of the first example embodiment.
[Description on Operation]
Next, an operation of the present example embodiment is described with reference to FIG. 15 to FIG. 17.

The frequency selective plate 100 described in the present example embodiment connects between conductive vias 102 adjacent to each other in the X-axis direction by using two layers by a length corresponding to 1.5 times of a distance between the conductive vias 102, in place of the conductive pattern 103 described in the first example embodiment. Therefore, as compared with a length of the conductive loop 106 in the first example embodiment, a length of the conductive loop 106 to be formed by the conductive vias 401 to 402, and the conductive patterns 403 to 405 in the present example embodiment is long.

Therefore, a total length of the conductive loop 106 in the present example embodiment is long, even when a physical outer peripheral size of the conductive loop 106 in the present example embodiment is the same as a physical outer peripheral size of the conductive loop 106 in the first example embodiment. Therefore, it is possible to shorten a physical size of an operating unit cell in the present example, while retaining a same electrical length, as compared with an operating unit cell in the first example embodiment.

Consequently, in the frequency selective plate 100 of the present example embodiment, it is possible to implement a frequency selective plate designable in any shape and size, as compared with a frequency selective plate described in the first example embodiment.

Note that, in a configuration of the present example embodiment, for simplification, an electrical length regarding the conductive patterns 403, 404, and 405 associated with the conductive pattern 103 illustrated in FIG. 1 is increased by setting the electrical length equal to a length corresponding to 1.5 times of a distance between conductive vias 102 by using two conductive layers. Alternatively, as illustrated in FIG. 17, the frequency selective plate 100 may include conductive vias 406 to 407, and conductive patterns 408 to 410, which electrically connect between conductive vias 102 adjacent to each other in the Y-axis direction by using two layers by a length corresponding to 1.5 times of a distance between the conductive vias 102.

Figure 17:
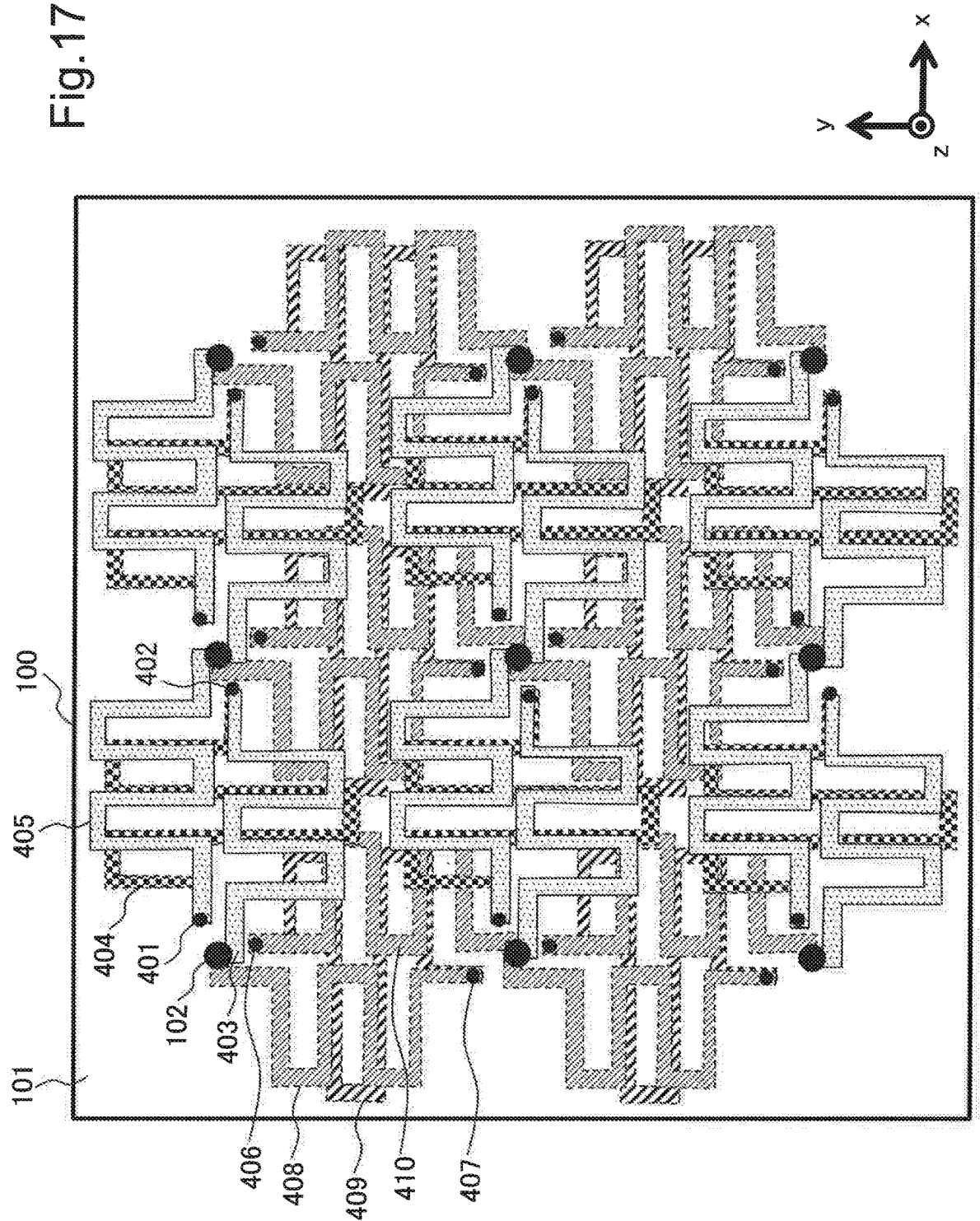
FIG. 17 is a diagram illustrating a modification example of the fourth example embodiment.

Further, in a configuration of FIG. 17, through-vias are formed as the conductive vias 401 to 402, and the conductive vias 406 to 407. Alternatively, interlayer vias in the Z-axis direction may be formed in a desired interlayer of the dielectric substrate 101.

Note that a shape of the conductive patterns 403 to 405, and the conductive patterns 408 to 410 in FIG. 17 is not limited to a meander shape. Further, an order of layers is not limited to the above.

Further, in FIG. 17, conductive vias other than the conductive vias 401 to 402, and the conductive vias 406 to 407 may be formed near the respective conductive vias 102, and a conductive pattern other than the conductive patterns 403 to 405, and the conductive patterns 408 to 410 may be formed on a further different layer of the dielectric substrate 101. Further, conductive vias 102 adjacent to each other by electrically connected by setting an electrical length equal to a length longer than a length corresponding to 1.5 times of a distance between the conductive vias 102 by using these conductive vias and conductive patterns.

Fifth Example Embodiment

Next, a fifth example embodiment is described in detail with reference to FIG. 18 and FIG. 19.

Figure 18:
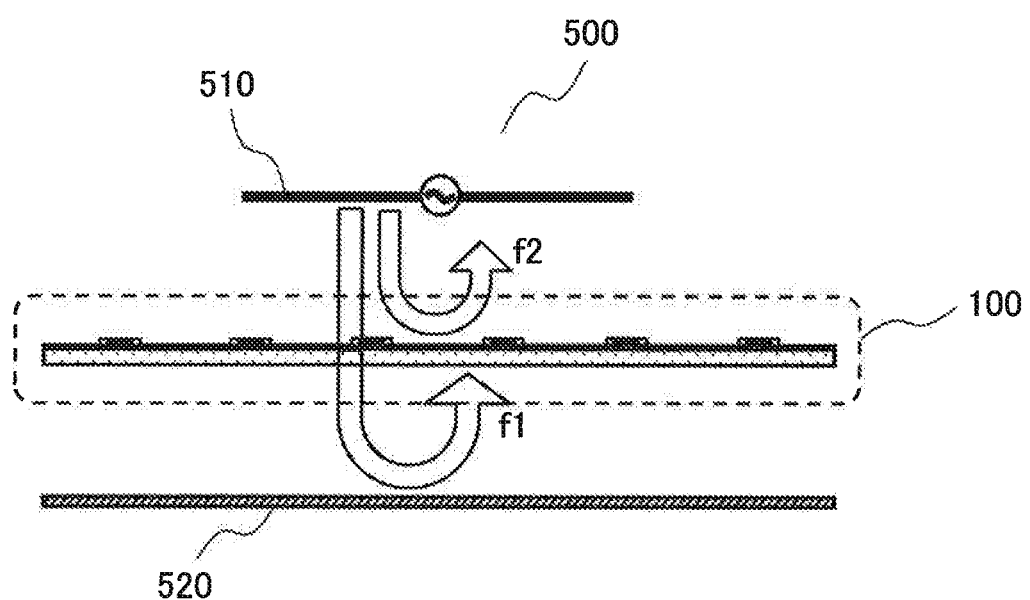
FIG. 18 is a diagram illustrating a configuration example of a fifth example embodiment.
Figure 19:
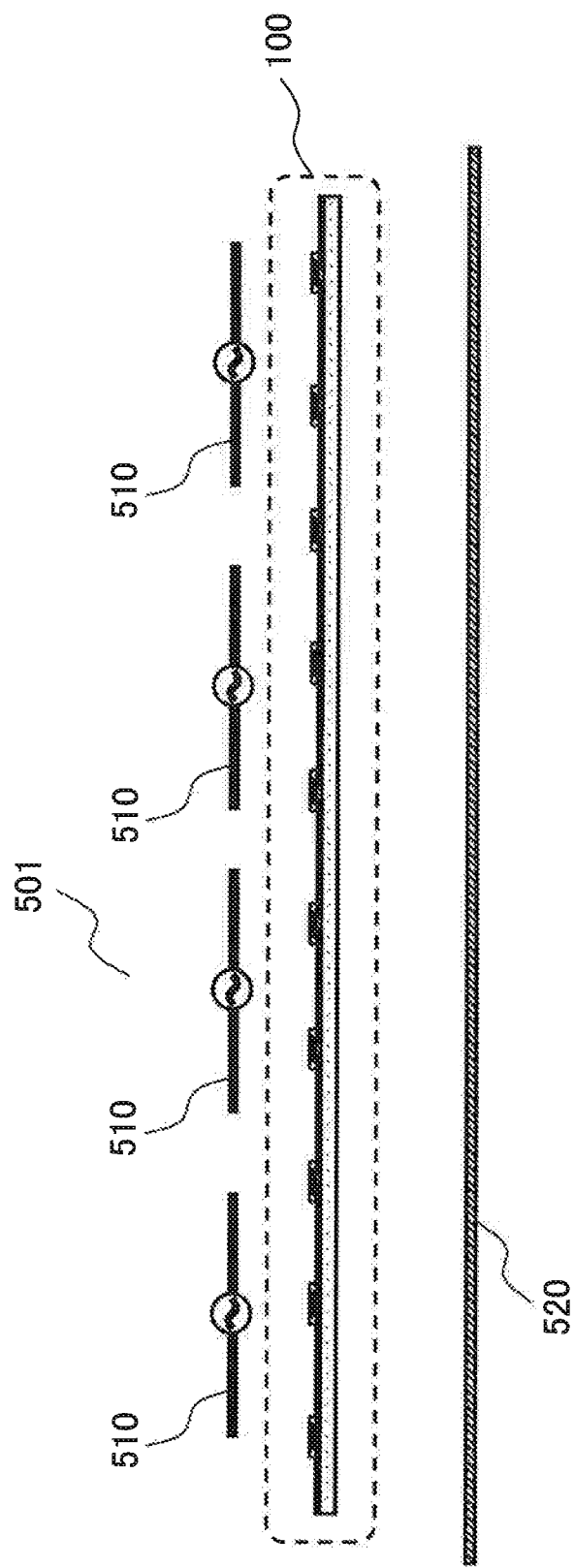
FIG. 19 is a diagram illustrating a configuration example of the fifth example embodiment.

FIG. 18 is a front view illustrating a configuration example of a wireless communication device 500 in the present example embodiment.

The wireless communication device 500 in the present example embodiment includes a multi-band antenna 510 connected to an wireless communication circuit, and capable of radiating wireless signals of at least a first operating frequency f1 and a second operating frequency f2 to a space.

Further, the wireless communication device 500 includes the frequency selective plate 100 described in the first example embodiment, which is disposed away from the multi-band antenna 510 by a predetermined distance. Further, the wireless communication device 500 includes a conductive reflection plate 520 disposed to face the frequency selective plate 100 on a side opposite to the multi-band antenna 510 with respect to the frequency selective plate 100.

Further, the frequency selective plate 100 is adjusted to transmit an electromagnetic wave of the first operating frequency f1, and reflect an electromagnetic wave of the second operating frequency f2.

According to this configuration, the wireless communication device 500 is operated as a directive antenna including the conductive reflection plate 520 as a reflection plate at the first operating frequency f1, and is operated as a directive antenna including the frequency selective plate 100 as a reflection plate at the second operating frequency f2.

Further, when the multi-band antenna 510, the conductive reflection plate 520, and a frequency selective surface are disposed as described below, it is possible to satisfy a condition in which an electromagnetic wave to be radiated from an antenna, and an electromagnetic wave reflected on a reflection plate are strengthened each other at any of the frequencies f1 and f2.

Specifically, the multi-band antenna 510 and the conductive reflection plate 520 are disposed at such positions that a distance between the multi-band antenna 510 and the conductive reflection plate 520 is equal to about one-fourth of a wavelength in a free space at the first operating frequency f1. Further, the multi-band antenna 510 and the frequency selective plate 100 are disposed at such positions that a distance between the multi-band antenna 510 and the frequency selective plate 100 is equal to about one-fourth of a wavelength in a free space at the second operating frequency f2.

As described above, the wireless communication device 500 according to the present example embodiment is able to satisfy requirements on directivity by a reflection plate, and good radiation characteristics at a plurality of frequencies.

Note that, in the present example embodiment, a configuration in which the number of multi-band antennas 510 is one is described as an example. Alternatively, as illustrated in FIG. 19, an antenna array 501 may be configured by disposing a plurality of multi-band antennas 510.

Further, in the present example embodiment, a case that the multi-band antenna 510 is operated at two frequencies is described as an example. Alternatively, a configuration in which three or more operating frequencies are provided may also be available. The above-described configuration is implementable by further additionally disposing a frequency selective plate between the multi-band antenna 510 and the conductive reflection plate 520.

Further, in the present example embodiment, a case that the frequency selective plate 100 described in the first example embodiment is employed as a frequency selective plate is described. Alternatively, a configuration in which a frequency selective plate described in other example embodiments is employed may be available.

Sixth Example Embodiment

Figure 20:
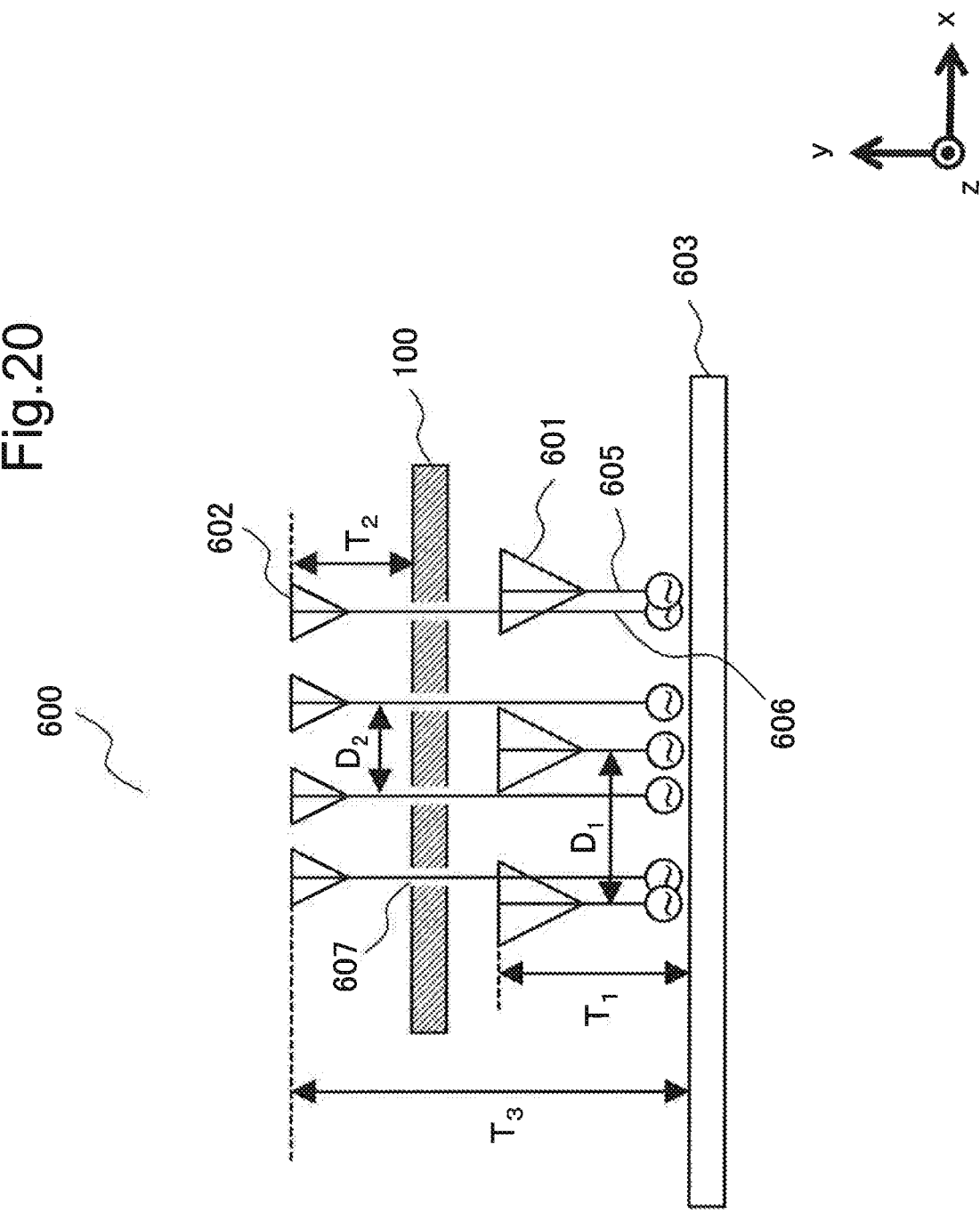
FIG. 20 is a diagram illustrating a configuration example of a sixth example embodiment.

Next, a sixth example embodiment is described in detail with reference to FIG. 20.
[Description on Configuration]
FIG. 20 is a cross-sectional view illustrating a configuration example of a wireless communication device 600 in the sixth example embodiment when viewed from a front direction.

The wireless communication device 600 includes a plurality of first antenna elements 601, a plurality of second antenna elements 602, a conductive reflection plate 603, and a frequency selective plate 100. A power supply line 605 is connected to each first antenna element 601, and a power supply line 606 is connected to each second antenna element 602. Further, the frequency selective plate 100 includes a plurality of openings 607.

The wireless communication device 600 transmits and receives electromagnetic waves associated with a plurality of frequency bands. The wireless communication device 600 is configured such that the conductive reflection plate 603, the plurality of first antenna elements 601, the frequency selective plate 100, and the plurality of second antenna elements 602 are laminated in this order. Specifically, the plurality of first antenna elements 601 and the plurality of second antenna elements 602 are disposed at different height positions from the conductive reflection plate 603. Herein, an operating frequency f1 of the first antenna element 601 is set lower than an operating frequency f2 of the second antenna element 602 (f1<f2).
[Description on Operation]
In the following, an operation of the sixth example embodiment is described with reference to FIG. 20.

The first antenna element 601 has a characteristic that the operating frequency f1 is a resonant frequency, and transmits and receives an electromagnetic wave of the frequency f1. The first antenna element 601 receives power from the power supply line 605. The first antenna element 601 is disposed at a height position T1 from the conductive reflection plate 603. In other words, a height of the first antenna element 601 is indicated by T1. Since the conductive reflection plate 603 is a short-circuit surface, the height T1 may desirably be about $(\lambda 1)/4$. Herein, the wavelength $\lambda 1$ indicates a wavelength in a case where an electromagnetic wave of the frequency f1 propagates through a substance (including air and a vacuum).

In the present example embodiment, the plurality of first antenna elements 601 are disposed on a same flat plane. Alternatively, all the plurality of first antenna elements 601 may not be on a same flat plane. Further, the number of first antenna elements 601 may be one. The plurality of first antenna elements 601 are periodically disposed in a square grid pattern at a predetermined interval D1 that depends on the operating frequency f1. A shape of the pattern, however, is not limited to the above. For example, the plurality of first antenna elements 601 may be disposed in a grid pattern in which another shape such as a rectangle or a triangle is provided for a unit grid, or in a concentric shape, a one-row array, a two-row array, or a shape other than an array.

The frequency selective plate 100 is designed to transmit an electromagnetic wave of a first frequency band including the frequency f1, and reflect an electromagnetic wave of a second frequency band being a frequency band other than the first frequency band and including the frequency f2, similarly to the frequency selective plate 100 in the fifth example embodiment. At least a part of the frequency selective plate 100 is disposed to face the conductive reflection plate 603 via the first antenna elements 601. The frequency selective plate 100 is operated as a conductive reflection plate for the second antenna elements 602 to be described later.

Further, the frequency selective plate 100 includes the plurality of openings 607 for passing the power supply lines 606 of the plurality of second antenna elements 602 to be described later. According to this configuration, the power supply lines 606 are disposed substantially perpendicular to the frequency selective plate 100. Since wiring of the power supply lines 606 is not formed on a plane parallel to the frequency selective plate 100, the frequency selective plate 100 is hardly affected by the power supply lines 606. Therefore, the frequency selective plate 100 in the present example embodiment is free from deterioration of performance as a frequency selective plate by the power supply lines 606.

Further, since wiring of the power supply lines 606 is not formed on a plane parallel to the frequency selective plate 100 by forming the openings 607 in the frequency selective plate 100, performance of the second antenna elements 602 is hardly affected by the power supply lines 606. Therefore, the second antenna elements 602 in the present example embodiment are free from deterioration of performance as antenna elements by the power supply lines 606.

The openings 607 are formed by removing a part of a plurality of conductive loops 106 constituting the frequency selective plate 100, for example. However, a configuration of the opening 607 is not limited to the above. The opening 607 may desirably be as small as possible. However, the inventors found that performance of the frequency selective plate 100 hardly changes, when a diameter of the opening 607 is equal to or smaller than $(\lambda 2)/2$. Herein, the wavelength $\lambda 2$ indicates a wavelength in a case where an electromagnetic wave of the frequency f2 propagates through a substance (including air and a vacuum). Further, the opening 607 may have any shape, as far as a diameter of the opening 607 is equal to or smaller than $(\lambda 2)/2$. For example, the opening 607 may have a slot shape of a size capable of inserting the power supply line 606, or may have any other shape.

In the present example embodiment, a plurality of openings 607 are formed. However, in a case where the number of second antenna elements 602 is one, the number of openings 607 may be one. Further, in a case where the power supply lines 606 do not affect performance of the frequency selective plate 100, or in a case where it is possible to dispose wiring in such a way that the power supply lines 606 do not affect the frequency selective plate 100, an opening 607 may be omitted.

Further, in the present example embodiment, the frequency selective plate 100 may have a structure having the above-described function only in a polarization direction associated with the first antenna element 601 and the second antenna element 602.

Next, the second antenna element 602 has a characteristic that the operating frequency f2 being a frequency higher than the frequency f1 is a resonant frequency, and transmits and receives an electromagnetic wave of the frequency f2. The second antenna element 602 receives power from the power supply line 606, and is disposed at a position away from a surface opposite to a surface facing the first antenna element 601 of the frequency selective plate 100 by a distance T2. Further, a height of the second antenna element 602 (distance from the conductive reflection plate 603) is indicated by T3. Herein, the frequency selective plate 100 is regarded as a conductive reflection plate for the second antenna elements 602. Since a conductive reflection plate is a short-circuit surface, the distance T2 from the frequency selective plate 100 to the second antenna element 602 may desirably be about $(\lambda 2)/4$.

In the present example embodiment, a plurality of second antenna elements 602 are disposed on a same flat plane. Alternatively, all the plurality of second antenna elements 602 may not be disposed on a same flat plane. Further, the number of second antenna elements 602 may be one. Further, the plurality of second antenna elements 602 are periodically disposed in a square grid pattern at a predetermined interval D2 that depends on the operating frequency f2. A shape of the pattern, however, is not limited to the above. For example, the plurality of second antenna elements 602 may be disposed in a grid pattern in which another shape such as a rectangle or a triangle is provided for a unit grid, or in a concentric shape, a one-row array, a two-row array, or a shape other than an array.

Alternatively, in the present example embodiment, a plurality of first antenna elements 601 and a plurality of second antenna elements 602 are respectively independently disposed at an interval. These configurations, however, are not limited to the above. For example, a plurality of first antenna elements 601 may be disposed on a same dielectric layer, and a plurality of second antenna elements 602 may be disposed on another dielectric layer.

Next, the plurality of first antenna elements 601 and the plurality of second antenna elements 602 are disposed at predetermined intervals D1 and D2 that depend on respective operating frequencies f1 and f2 (specifically, D1≠D2). In this case, the wireless communication device 600 is able to perform beam forming at respective frequencies f1 and f2 by respective antenna arrays having the intervals D1 and D2. At this occasion, the intervals D1 and D2 may respectively desirably be about $(\lambda 1)/2$ and $(\lambda 2)/2$ for the purpose of reducing a side lobe, and the like. In a case where the first antenna elements 601 and the second antenna elements 602 are disposed as described above, it is substantially inevitable that the first antenna elements 601 and the second antenna elements 602 approach in a planar direction of the conductive reflection plate 603.

Herein, normally, performances of the first antenna element 601 and the second antenna element 602 respectively associated with different frequencies are affected each other when the first antenna element 601 and the second antenna element 602 are disposed close to each other. Consequently, performances of respective antenna elements are deteriorated.

However, in the wireless communication device 600 of the present example embodiment, the frequency selective plate 100 is disposed in parallel to a plane of the conductive reflection plate 603 between a pattern of the first antenna elements 601 and a pattern of the second antenna elements 602. In other words, the wireless communication device 600 has a laminate structure that the height T1 from the conductive reflection plate 603 to the first antenna element 601, and the distance T3 from the conductive reflection plate 603 to the second antenna element 602 are different (in the present example embodiment, T1<T3). Since the frequency selective plate 100 transmits an electromagnetic wave of the frequency f1, and reflects an electromagnetic wave of the frequency f2, the wireless communication device 600 is able to reduce an influence of the first antenna element 601 on the second antenna element 602.

Herein, it is assumed that the frequency selective plate 100 is not employed, and the first antenna elements 601 and the second antenna elements 602 are disposed on the conductive reflection plate 603. In this case, a height from the conductive reflection plate 603 to the first antenna elements 601 may desirably be $(\lambda 1)/2$ as described above. Further, a height from the conductive reflection plate 603 to the second antenna elements 602 may desirably be $(\lambda 2)/2$ as described above. Herein, since $\lambda 1 > \lambda 2$, a height from the conductive reflection plate 603 to the second antenna elements 602 is lower than a height from the conductive reflection plate 603 to the first antenna elements 601.

A first antenna element and a second antenna element adversely affect to antenna characteristics thereof by space coupling. Further, when a first antenna element having a large shape is disposed above a second antenna element having a small shape, radiation characteristic deterioration of the second antenna element is particularly large, since the first antenna element being a metal member that blocks radiation of the second antenna element having a small shape is large.

However, in the present example embodiment, by employing the frequency selective plate 100, it becomes possible to reflect downward radiation of a first antenna element by the conductive reflection plate 603, and reflect downward radiation of a second antenna element by the frequency selective plate 100. Therefore, it becomes possible to dispose a second antenna element having a small shape above a first antenna element having a large shape. Further, since a second antenna element being a metal member that blocks upward radiation of a first antenna element having a large shape is small, radiation characteristic deterioration of the first antenna element is small.

In this way, in the wireless communication device 600 of the present example embodiment, by disposing a frequency selective plate between antenna elements of a multi-band antenna as described above, respective antenna elements are able to reduce deterioration with respect to characteristics before the antenna elements are disposed close to one another.

Note that, in the present example embodiment, an example in which the frequency selective plate 100 described in the first example embodiment is employed as a frequency selective plate is described. Alternatively, a frequency selective plate described in other example embodiments may be employed.

Seventh Example Embodiment

Figure 21:
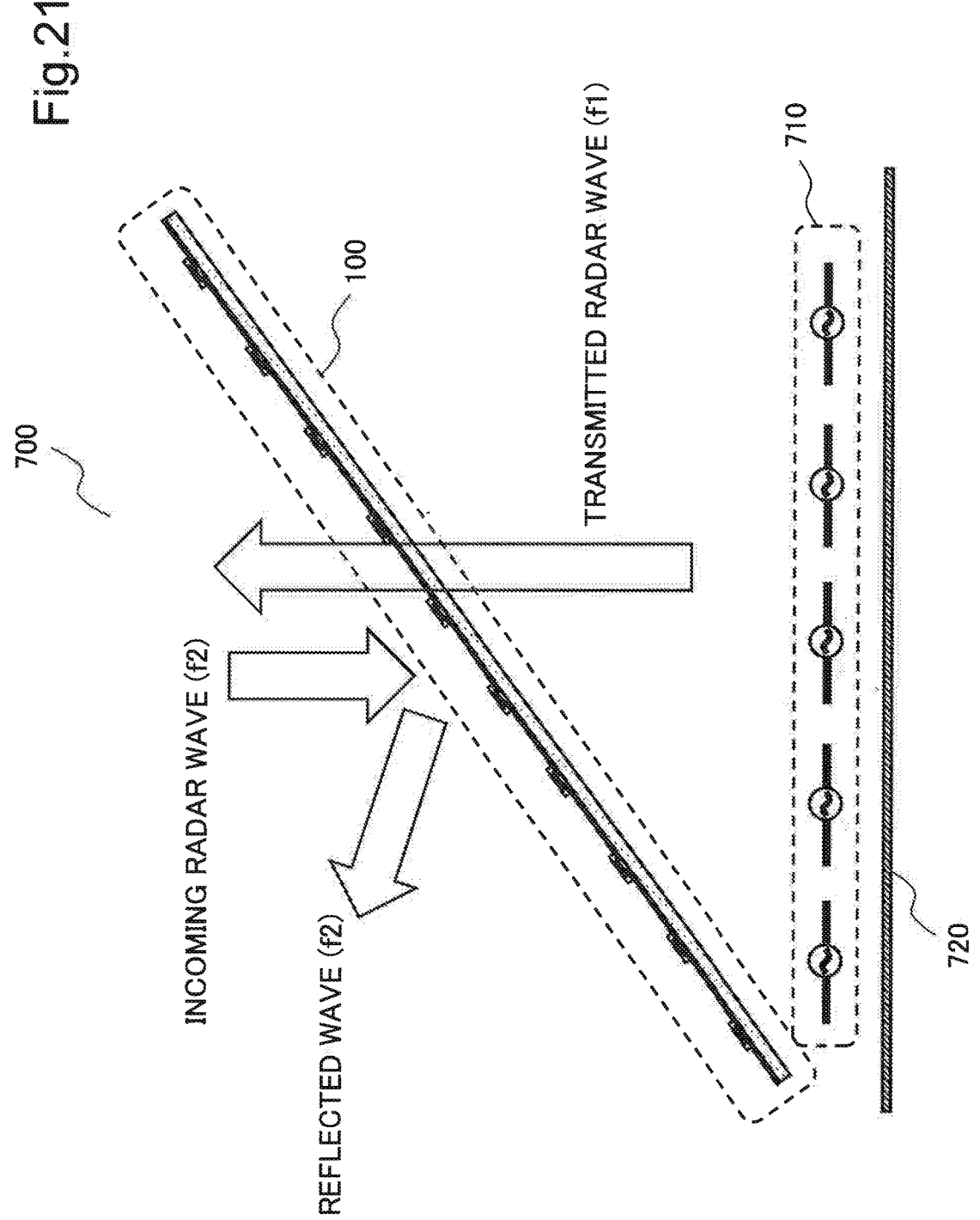
FIG. 21 is a diagram illustrating a configuration example of a seventh example embodiment.
Figure 22:
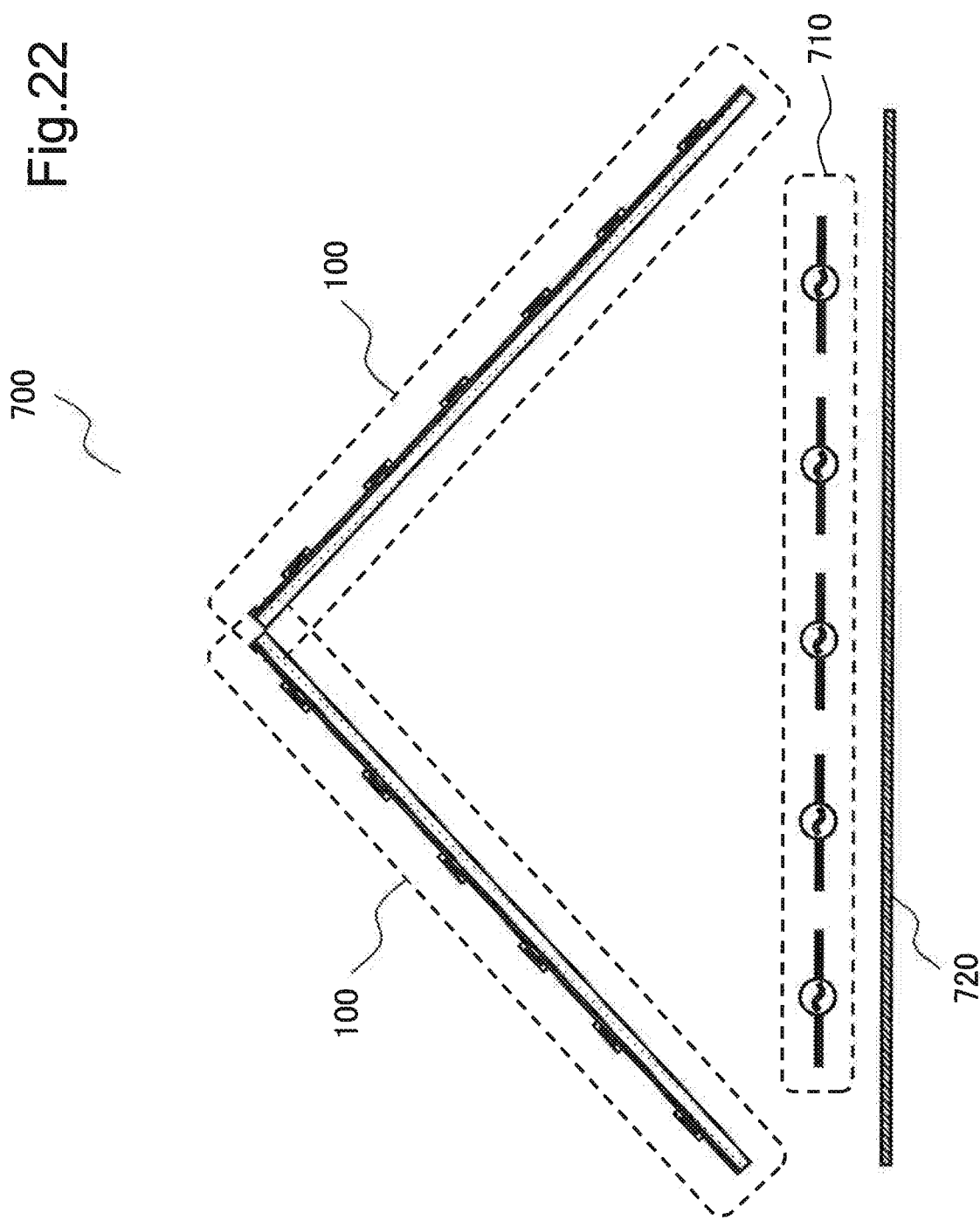
FIG. 22 is a diagram illustrating a modification example of the seventh example embodiment.

Next, a seventh example embodiment is described in detail with reference to FIG. 21 and FIG. 22.
[Description on Configuration]
FIG. 21 is a side view illustrating a configuration example of a radar device in the seventh example embodiment.

A radar device 700 includes an antenna array 710 for transmitting a radar wave toward an object to be detected, and a conductive reflection plate 720. Further, the radar device 700 further includes a frequency selective plate 100 disposed between the antenna array 710 and the object to be detected with a predetermined angle with respect to the conductive reflection plate 720.

The frequency selective plate 100 is adjusted to transmit an electromagnetic wave of a frequency f1 of a transmission radar wave to be radiated from the antenna array 710, and reflect an electromagnetic wave of a frequency f2 of an incoming radar wave transmitted from the outside.

According to the above-described configuration, the radar device 700 is able to reflect a radar wave of another device incoming from a front side in a direction other than the front side, and is able to implement a radar device in which a radar cross section with respect to the front side is greatly reduced.

Note that, in this section, a configuration in which the frequency selective plate 100 has a flat plane shape is described as an example. For example, as illustrated in FIG. 22, the frequency selective plate 100 may have a shape obtained by combining two flat planes, a conical shape, or a pyramidal shape.

Further, in the present example embodiment, an example in which the frequency selective plate 100 described in the first example embodiment is employed as a frequency selective plate is described. Alternatively, a frequency selective plate described in other example embodiments may be employed.

Eighth Example Embodiment

Next, an eighth example embodiment is described with reference to FIG. 23 to FIG. 33.

Figure 23:
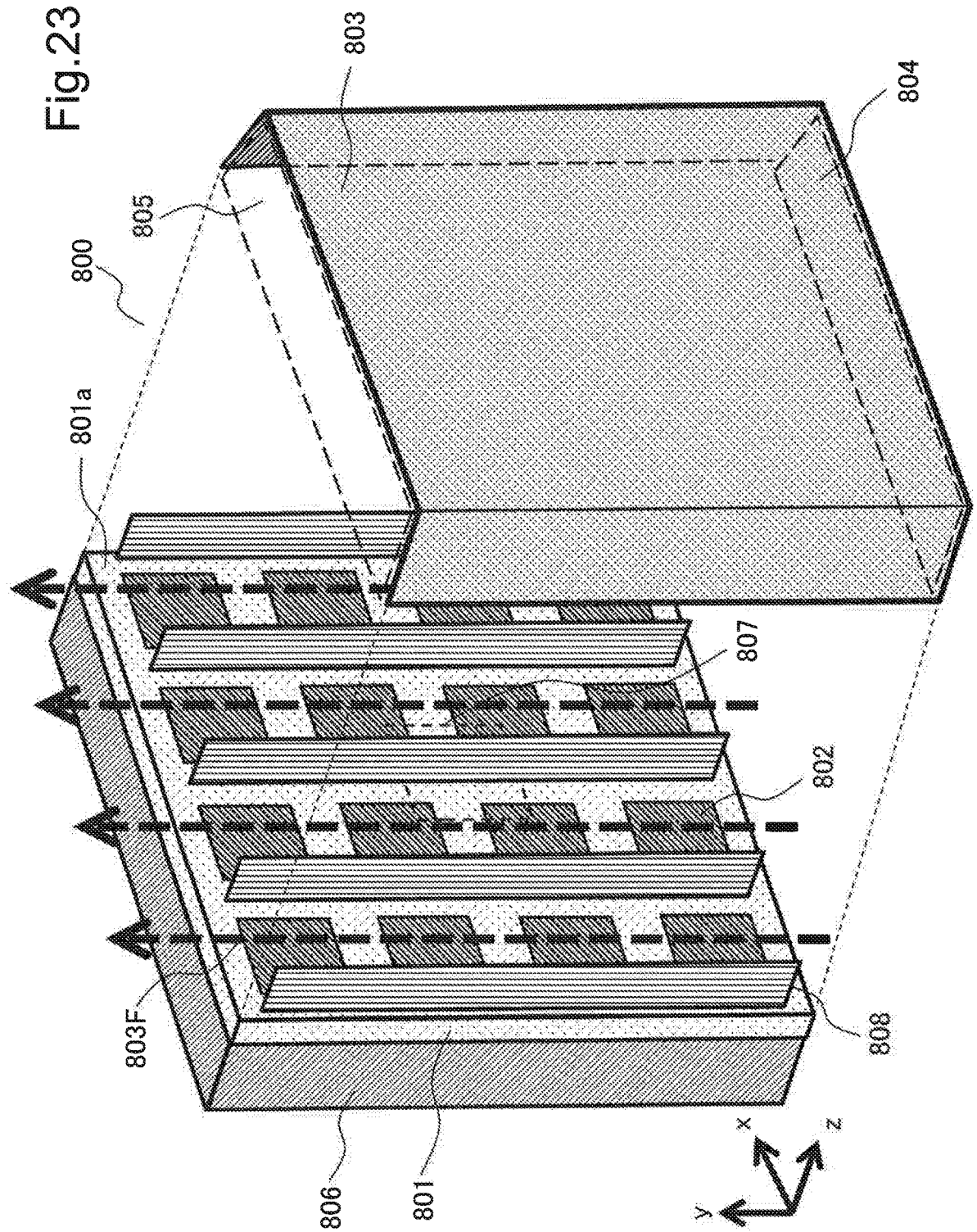
FIG. 23 is a diagram illustrating a configuration example of an eighth example embodiment.

FIG. 23 is a perspective view of a wireless communication device 800 in the present example embodiment.

The wireless communication device 800 includes a box-shaped housing portion 806, a reflection plate 801 integrally mounted on the housing portion 806, and an array antenna constituted by a plurality of antenna elements 802 provided on the reflection plate 801. The array antenna indicates a mass in which a plurality of the antenna elements 802 are arrayed. Further, the wireless communication device 800 further includes a radome 803 for covering the array antenna constituted by the plurality of antenna elements 802.

A wireless communication circuit 807 is incorporated in the housing portion 806. The wireless communication circuit 807 is electrically connected to the array antenna constituted by the plurality of antenna elements 802. According to this configuration, a wireless signal generated in the wireless communication circuit 807 is radiated into the atmosphere as an electromagnetic wave via the array antenna constituted by the plurality of antenna elements 802, and is transmitted and received to and from another equipment (e.g. a wireless terminal, and the like).

Further, the wireless communication circuit 807 is connected to the reflection plate 801 by a member having high thermal conductivity such as a solder ball of a ball grid array (BGA), or thermal conductive underfill filled around a solder ball. Therefore, a part of heat generated in the communication circuit 807 is transmitted to the reflection plate 801.

The reflection plate 801 is a plate-shaped member made of a material having conductivity. One surface of the reflection plate 801 serves as a reflection surface 801a for reflecting an electromagnetic wave. The reflection plate 801 is disposed in parallel to a vertical direction.

In the following description, as illustrated in FIG. 23, an axis parallel to a vertical direction on a flat plane parallel to the reflection plate 801 is defined as a y-axis, a direction orthogonal to the y-axis on the flat plane is defined as an x-axis, and an axis orthogonal to both the x-axis and the y-axis is defined as a z-axis.

The plurality of antenna elements 802 are disposed on a surface parallel to the reflection surface 801a with a certain interval. As illustrated in FIG. 23, the antenna element 802 is a patch antenna, and a conductive surface of a patch of the antenna element 802 is formed on a surface parallel to and away from the reflection surface 801a with a predetermined gap. Further, the plurality of antenna elements 802 are disposed in a grid pattern on a surface parallel to the x-axis and the y-axis.

In this way, by disposing the plurality of antenna elements 802 on a surface parallel to the reflection surface 801a, an array antenna constituted by the plurality of antenna elements 802 is formed. Further, by controlling a phase and an amplitude of a signal for each antenna element 802, it is possible to form a beam in a specific direction.

Herein, a wireless device of the wireless communication device 800 is described.

Figure 32:
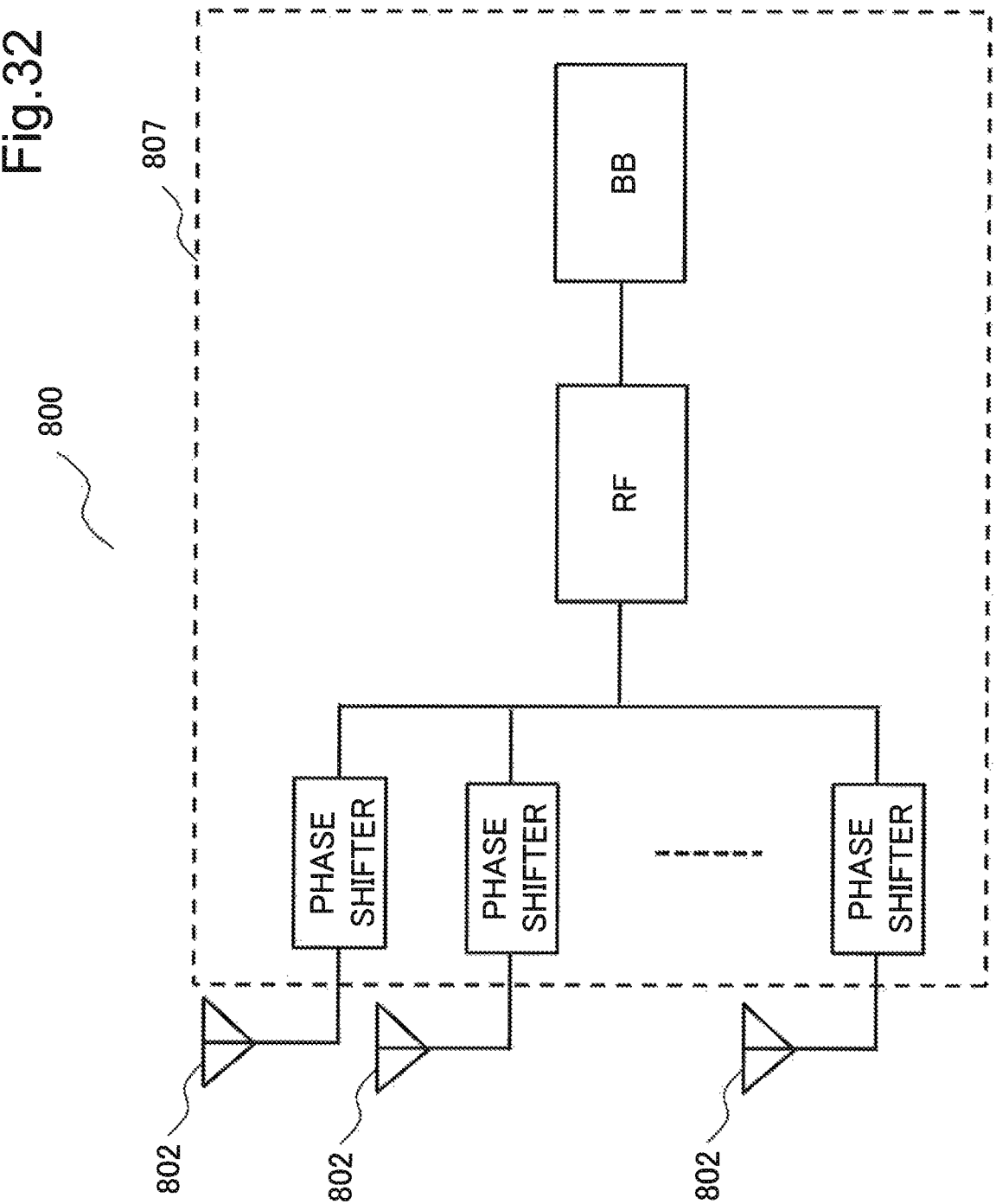
FIG. 32 is a diagram illustrating a configuration example of the eighth example embodiment.

The wireless communication device 800 includes the plurality of antenna elements 802 and the wireless communication circuit 807 as constituent elements, as illustrated in FIG. 32, for example.

In the following, a case that the wireless communication device 800 receives a radio wave is described.

The wireless communication circuit 807 includes a phase shifter connected to each antenna element, and configured to shift a phase of an electrical signal by an instruction of a processing unit, and a radio frequency circuit (hereinafter, RF) for connecting output ends of the phase shifter by power combining. Further, an output of the RF is connected to an input end of a base band circuit (hereinafter, BB). The wireless communication device 800 is able to control a beam direction by shifting a phase of a phase shifter for each antenna element 802.

In the foregoing, a case that the wireless communication device 800 receives a radio wave is described. In a case where a radio wave is transmitted, it is possible to read power combining as power distribution by reversing the above-described relationship between input and output by reversibility of an antenna.

The wireless communication circuit 807 may have various configurations depending on a communication method. In the following, a case that the wireless communication device 800 receives a radio wave is described. The wireless communication circuit 807, however, is also applicable to a configuration in which a radio wave is transmitted as described above.

Figure 33:
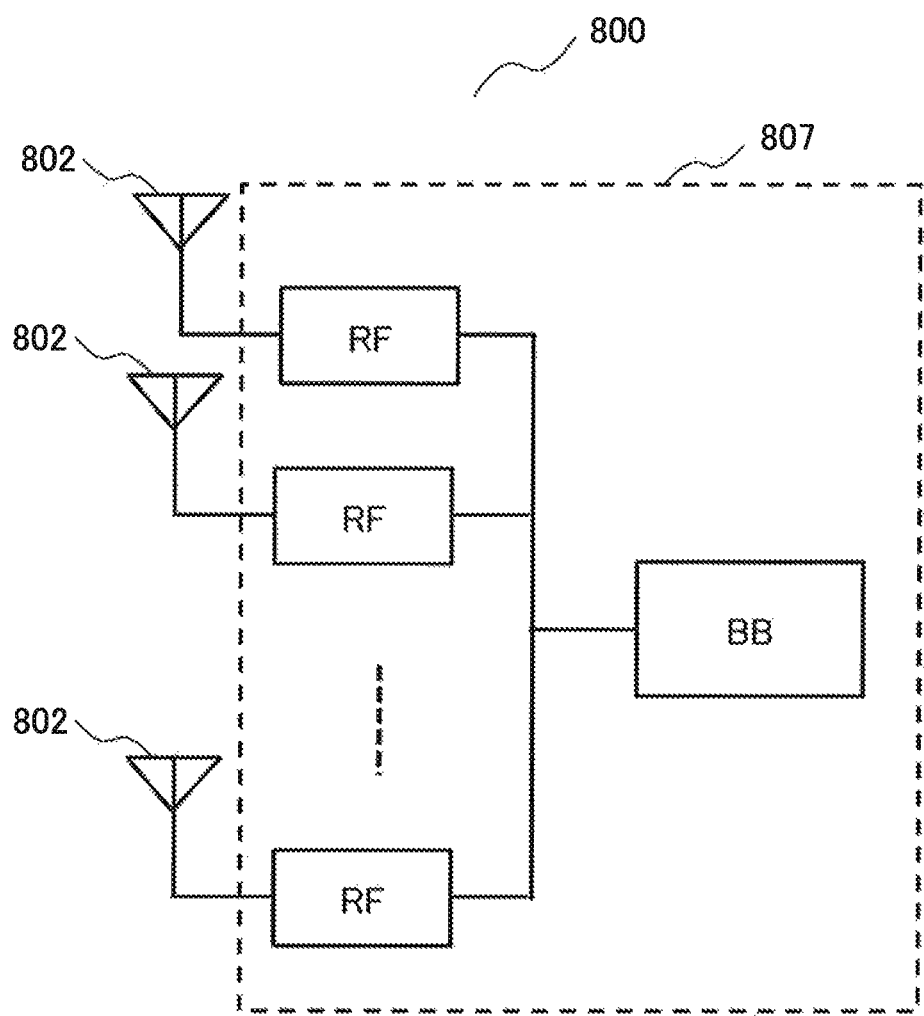
FIG. 33 is a diagram illustrating a configuration example of the eighth example embodiment.

In the wireless communication device 800 illustrated in FIG. 33, a signal received by an antenna element is input to an RF connected to each element, and an output of respective RFs is input to a BB. This configuration is employed for spatial multiplexing communication, in which a wireless signal different for each antenna element 802 is transmitted and received, and digital beamforming.

Note that the wireless communication device 800 may not include a BB, and a BB may be provided on the outside.

In both of the above-described device configurations of FIG. 32 and FIG. 33, since the wireless communication circuit 807 generates heat accompanied by an operation of a circuit, the device configurations may adversely affect operations of the wireless communication circuit 807 and another unillustrated circuit.

In view of the above, heat radiation of a wireless communication circuit is described in the following.

As illustrated in FIG. 23, the radome 803 is a plate-shaped member for covering a side of the reflection surface 801a of the reflection plate 801. The radome 803 is folded into a substantially C-shape when viewed from the y-axis direction. Both ends of the radome 803 in the x-axis direction are respectively fixed to both end portions of the housing portion 806 parallel to the y-axis.

When the radome 803 is fixed to the housing portion 806 as described above, a space serving as airflow passages 803F is formed between the radome 803 and the reflection surface 801a.

Further, both ends of the airflow passages 803F in the y-axis direction are respectively opened to the outside. Out of these openings, an opening opened in a minus direction of the y-axis serves as an air intake hole 804, and an opening opened vertically upward (in a plus direction of the y-axis) serves as an air discharge hole 805. The above-described airflow passages 803F communicates with the outside via the air intake hole 804 and the air discharge hole 805.

Note that the radome 803 in the present example embodiment may desirably be made of a dielectric material, or at least a part of the radome 803 may desirably be constituted by the frequency selective plate 100, so that a signal to be radiated from the above-described antenna element 802 is not blocked.

Further, FSS heat radiation fins 808, at least a part of which is constituted by a frequency selective plate, are disposed on the reflection surface 801a in a direction substantially perpendicular to the reflection surface 801a and along the airflow passages 803F. The FSS heat radiation fins 808 are connected to the reflection plate 801 by a member of high thermal conductivity such as a solder clip or a metal clip, for example. A part of heat generated in the wireless communication circuit 807 and transmitted through the reflection plate 801 is transmitted to the FSS heat radiation fins 808.

Heat transmitted to the FSS heat radiation fins 808 is radiated to the outside by transmitting the heat from the respective FSS heat radiation fins 808 to the air. Further, since external air is guided to the airflow passages 803F formed inside the radome 803, heat radiation from the respective FSS heat radiation fins 808 is promoted.

Specifically, after external air is guided from the air intake hole 804 to the airflow passages 803F, heat is deprived of from the air by contact with outer surfaces of the FSS heat radiation fins 808. Further, air that absorbs heat of the FSS heat radiation fins 808 is released to the outside of the radome 803 through the air discharge hole 805.

In particular, a force directing vertically upward accompanied by a decrease in density is applied to air whose temperature is increased by heat radiation of the FSS heat radiation fins 808. By the force, natural convection of air from vertically downward toward vertically upward is formed in the airflow passages 803F.

Herein, the air intake hole 804 is formed in a lower portion of the airflow passages 803F inside the radome 803, and the air discharge hole 805 is formed in an upper portion of the airflow passages 803F.

By disposing the air intake hole 804 and the air discharge hole 805 on an upper side and a lower side of the radome 803 as described above, external air guided from the air intake hole 804 into the airflow passages 803F smoothly flows toward the air discharge hole 805 formed on a vertically upper side of the airflow passages 803F. Concurrently, fresh external air is continuously supplied from the air intake hole 804.

Specifically, continuous natural convection from the air intake hole 804 toward the air discharge hole 805 occurs (so-called a chimney effect). Therefore, when the wireless communication device 800 is continuously operated, it is possible to continuously and efficiently cool the wireless communication circuit 807.

Further, as described above, the FSS heat radiation fin 808 is formed into a plate shape, and both surfaces thereof in a thickness direction are disposed to face both sides in the x-axis direction. In other words, a projection area of the FSS heat radiation fin 808 becomes sufficiently small, when viewed from a direction in which air flows in the airflow passage 803F. According to this configuration, it is less likely that the FSS heat radiation fins 808 may interfere airflow in the airflow passages 803F.

Further, since the FSS heat radiation fins 808 of the wireless communication device 800 are constituted by the frequency selective plate 100, it is possible to transmit an electromagnetic wave of a specific band, regardless that the FSS heat radiation fins 808 are an integral metal member. Therefore, by designing the wireless communication device 800 in such a way that a transmission band of the frequency selective plate 100 includes an operating band of the antenna element 802, it is possible to suppress unwanted reflection which may interfere propagation of an electromagnetic wave to be radiated from the antenna element 802.

According to this configuration, it becomes possible to dispose the FSS heat radiation fins 808 also near the antenna elements 802, and it is possible to use an area of an antenna array 102R not only for radiation of a radio wave but also for heat radiation.

Further, there is a case that it may be impossible to set a size of the FSS heat radiation fins 808 in the z-axis direction equal to or larger than a predetermined size in order to reduce an external thickness of the wireless communication device 800. Since it becomes possible to design the frequency selective plate 100 in the present example embodiment in any shape by miniaturization of an operating unit cell, the frequency selective plate 100 is suitable for configuring the FSS heat radiation fins 808.

As described above, the wireless communication device 800 in the present example embodiment is able to reduce an external thickness of the wireless communication device 800 by employing a frequency selective plate designable in any shape and size for heat radiation fins.

Modification Examples of Eighth Example Embodiment

In the foregoing, the eighth example embodiment is described. The present invention, however, is not limited to the above-described example embodiment, and may be extended or modified as follows.

First Modification Example of Eighth Example Embodiment

In the eighth example embodiment, as illustrated in FIG. 23, a case that the wireless communication circuit 807 is disposed on a surface opposite to the reflection surface 801*a* of the reflection plate 801 is described as an example. Any configuration, however, may be employed, as far as the wireless communication circuit 807 is able to transmit heat to the reflection plate 801.

For example, the wireless communication circuit 807 may not necessarily be directly connected to the reflection plate 801, as far as the wireless communication circuit 807 and the reflection plate 801 are connected by a material of high thermal conductivity. Further, the wireless communication circuit 807 may be disposed on the reflection surface 801*a* of the reflection plate 801, or may have any other configuration.

Second Modification Example of Eighth Example Embodiment

Further, in the foregoing, it is described that the radome 803 in FIG. 23 may be constituted by a frequency selective plate. In view of the above, a frequency selective plate constituting the radome 803 may be connected to the reflection plate 801 by a member of high thermal conductivity such as a solder clip, a metal clip, a metal screw, or the like, so that a part of heat generated in the wireless communication circuit 807 and transmitted through the reflection plate 801 may be transmitted. At this occasion, the radome 803 is able to transmit an electromagnetic wave to be radiated from the antenna elements 802 by a frequency selective plate, and mechanically protect an antenna without interfering propagation of an electromagnetic wave.

Further, since a frequency selective plate constituting the radome 803 is an integral metal member, similarly to the FSS heat radiation fins 808, the frequency selective plate transmits heat generated in the wireless communication circuit 807, and radiates heat to the outside by transmitting the heat to the air. In this way, a radome employing a frequency selective plate is able to further improve heat radiation performance, as compared with a radome made of a dielectric material.

Third Modification Example of Eighth Example Embodiment

Further, holes different from the air intake hole 804 and the air discharge hole 805 may be formed in the radome 803 in FIG. 23. According to this configuration, it is possible to guide a further large amount of air into the airflow passages 803F, without interfering natural convection from the air intake hole 804 toward the air discharge hole 805. According to this configuration, it is possible to further improve cooling performance of the wireless communication device 800.

Fourth Modification Example of Eighth Example Embodiment

In the present example embodiment, a configuration including the radome 803 as illustrated in FIG. 23 is described as an example. Alternatively, in a case where it is not required to mechanically protect the antenna elements 802 and the heat radiation fins 808 from the outside, a configuration excluding the radome 803 may be employed. For example, in a case where a wireless communication device is installed indoors and at a place where there is no possibility that a foreign object hits the wireless communication device, the radome 803 may be omitted.

Fifth Modification Example of Eighth Example Embodiment

Further, as far as an environment where the wireless communication device 800 is installed is satisfactory, a heat radiation device (heat sink) may be provided on a back surface (a surface opposite to the reflection surface 801*a*) of the housing portion 806 of the wireless communication device 800 illustrated in FIG. 23. According to this configuration, it is possible to further improve heat radiation performance of the wireless communication device 800.

Sixth Modification Example of Eighth Example Embodiment

Further, a hood may be provided above the air discharge hole 805 of the wireless communication device 800 illustrated in FIG. 23 in such a way that the hood does not close an air discharge hole depending on an environment where the wireless communication device 800 is installed. According to this configuration, it is possible to prevent intrusion of rain and snow into the radome 803, and improve weather resistance of the wireless communication device 800.

Seventh Modification Example of Eighth Example Embodiment

The wireless communication device 800 illustrated in FIG. 23 is configured to promote heat radiation from the FSS heat radiation fins 808 by natural convection of air generated in the airflow passages 803F. Alternatively, it is also possible to employ a configuration in which forced convection occurs in the airflow passages 803F without depending on natural convection.

Specifically, a configuration in which a fan is provided in the air intake hole 804 may be proposed. The fan introduces air from the outside into the airflow passages 803F by being driven and rotated by power to be supplied from the outside. According to this configuration, forced air convection occurs in the airflow passages 803F.

According to this configuration, it is possible to obtain a further efficient and satisfactory heat radiation effect, as compared with heat radiation only by natural convection of air. Note that, as far as it is possible to form forced air convection in the airflow passages 803F, a fan may be provided at any other place. For example, a similar effect may be obtained even by a configuration in which a fan is provided in the air discharge hole 805.

Eighth Modification Example of Eighth Example Embodiment

Figure 24:
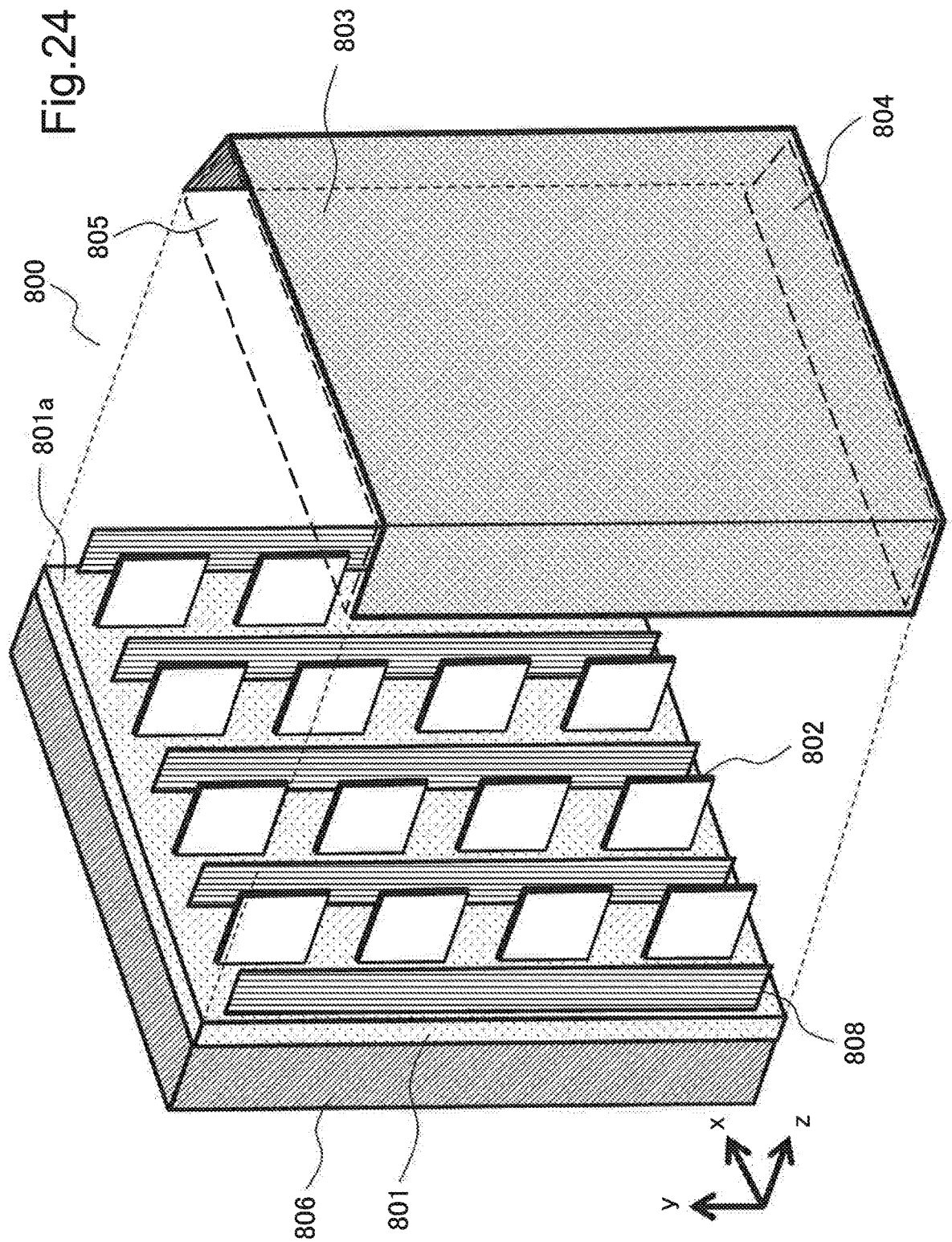
FIG. 24 is a diagram illustrating a modification example of the eighth example embodiment.
Figure 27:
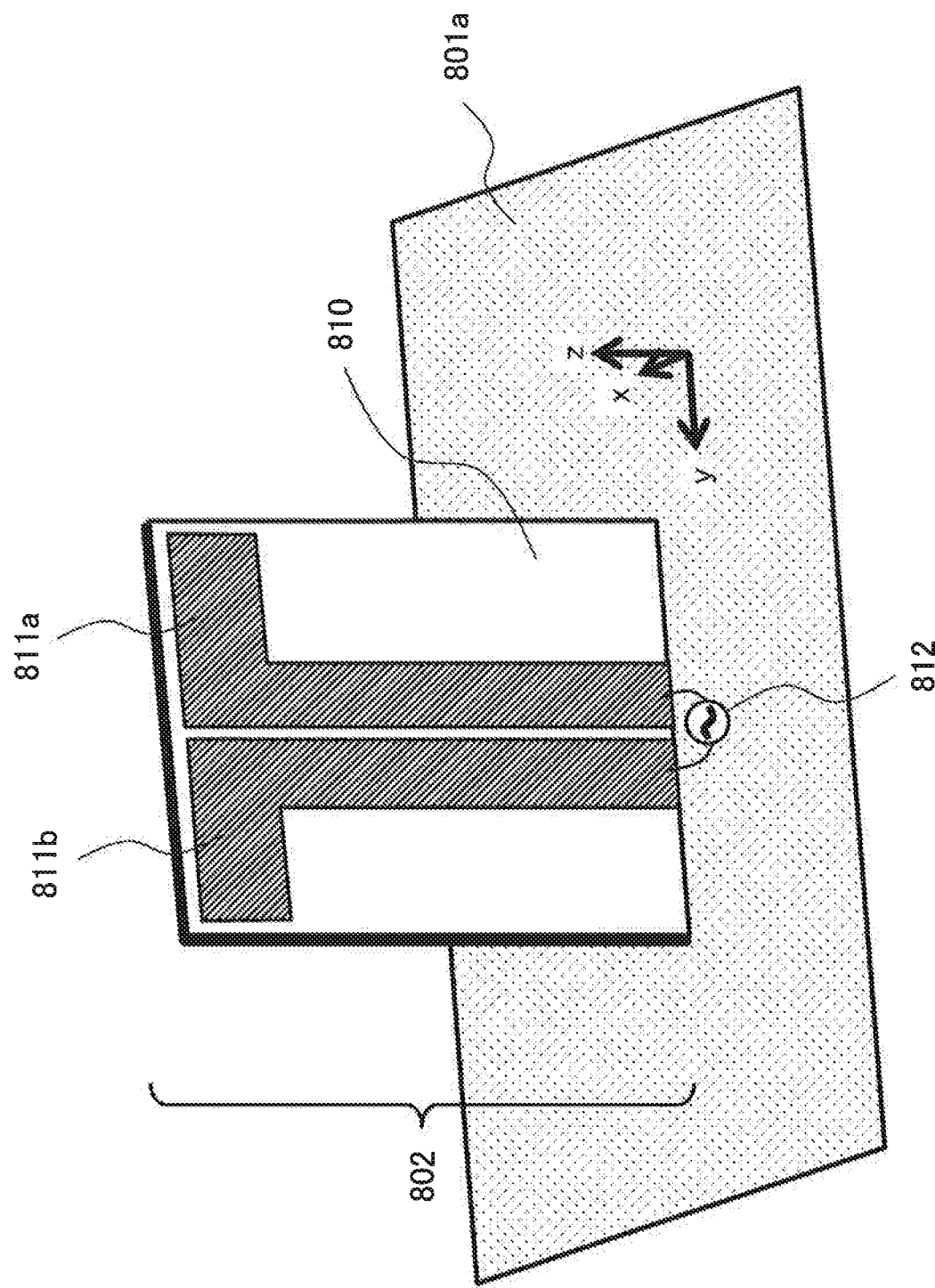
FIG. 27 is a diagram illustrating a modification example of the eighth example embodiment.

Further, as illustrated in FIG. 24, each of the antenna elements 802 may have a plate shape, and may be disposed in a direction substantially perpendicular to the reflection surface 801a. The plurality of antenna elements 802 in FIG. 24 are disposed in a grid pattern, when viewed from a direction normal to the reflection surface 801a (z-axis direction). Further, both surfaces of the antenna element 802 in a thickness direction respectively face the x-axis direction. Herein, as illustrated in FIG. 27, for example, the antenna element 802 is constituted by a plate-shaped dielectric substrate 810, an antenna pattern 811a, and an antenna pattern 811b, each of which is a substantially L-shaped conductive pattern formed on an outer surface of the dielectric substrate 810.

A conductive pattern may desirably be made of a material having good electrical conductivity and thermal conductivity, as exemplified by a copper film, for example. The dielectric substrate 810 is disposed in such a way that both surfaces in a thickness direction thereof face the x-axis direction as described above. The dielectric substrate 810 is formed by a printed substrate employing glass epoxy resin, or a ceramic substrate such as an LTCC, for example.

Further, the antenna pattern 811a and the antenna pattern 811b are connected to the wireless communication circuit 807 incorporated in the housing portion 806 via a power supply point 812. Further, by supplying power to the antenna pattern 811a and the antenna pattern 811b, a wireless signal generated in the wireless communication circuit 807 is excited.

As described above, individual antenna elements 802 form dipole antennas capable of transmitting and receiving an electromagnetic wave that is polarized in the above-described y-axis direction (vertical direction) by disposing the antenna pattern 811a and the antenna pattern 811b to face the x-axis direction.

Further, the wireless communication device 800 illustrated in FIG. 24 is able to implement further enhanced heat radiation performance, since it is also possible to employ the antenna elements 802 as heat radiation fins, in addition to the FSS heat radiation fins 108.

Ninth Modification Example of Eighth Example Embodiment

Figure 28:
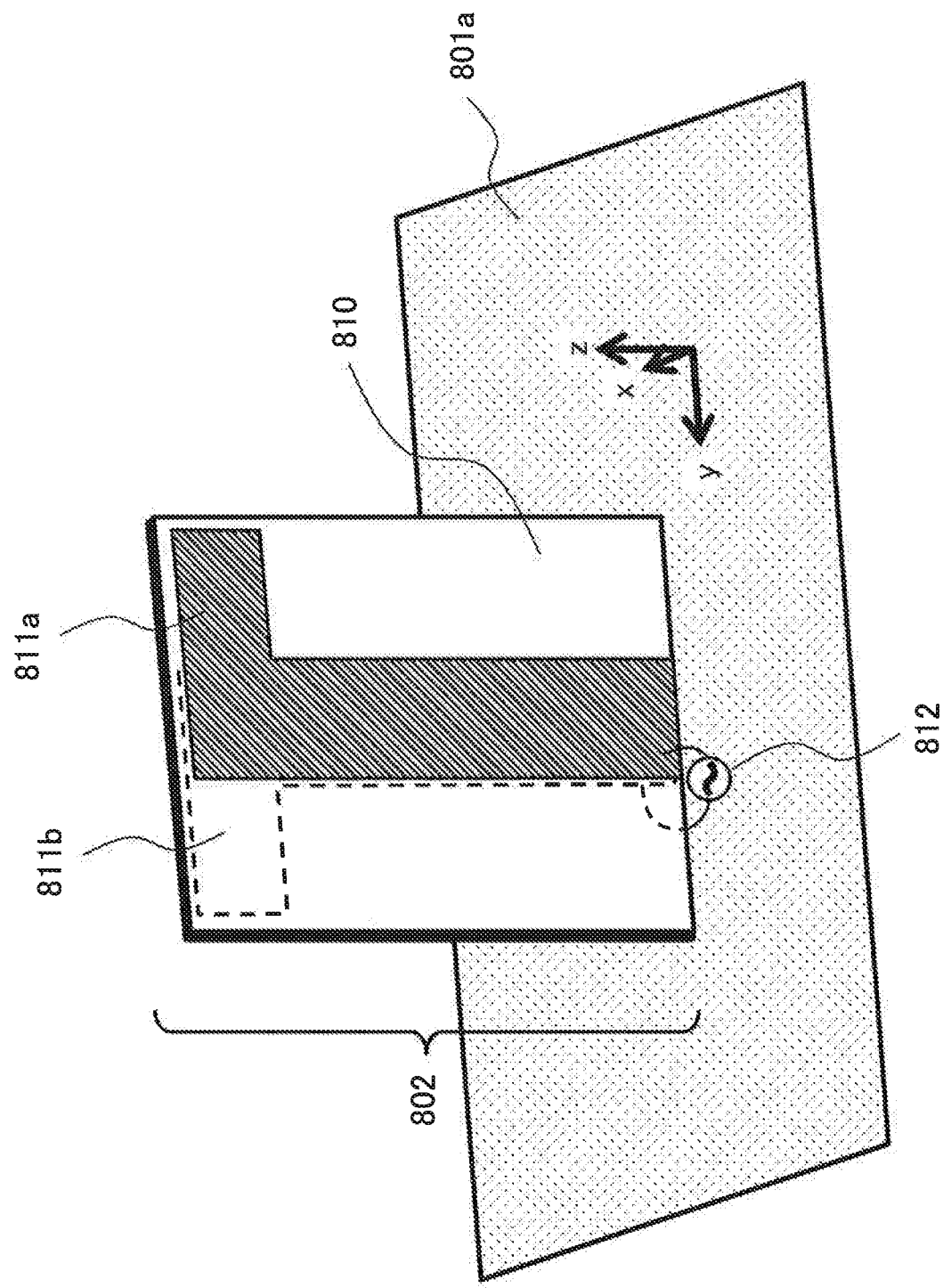
FIG. 28 is a diagram illustrating a modification example of the eighth example embodiment.

Regarding the antenna element 802 in FIG. 24 described in the eighth modification example of the eighth example embodiment, an antenna element in which the antenna patterns 811a and 811b are formed on one surface of the dielectric substrate 810, as illustrated in FIG. 27, is described as an example. However, a configuration of the antenna patterns 811a and 811b is not limited to the above. For example, as illustrated in FIG. 28, the antenna pattern 811a may be formed on one surface of the dielectric substrate 810, and the antenna pattern 811b may be formed on the other surface thereof.

Tenth Modification Example of Eighth Example Embodiment

Figure 25:
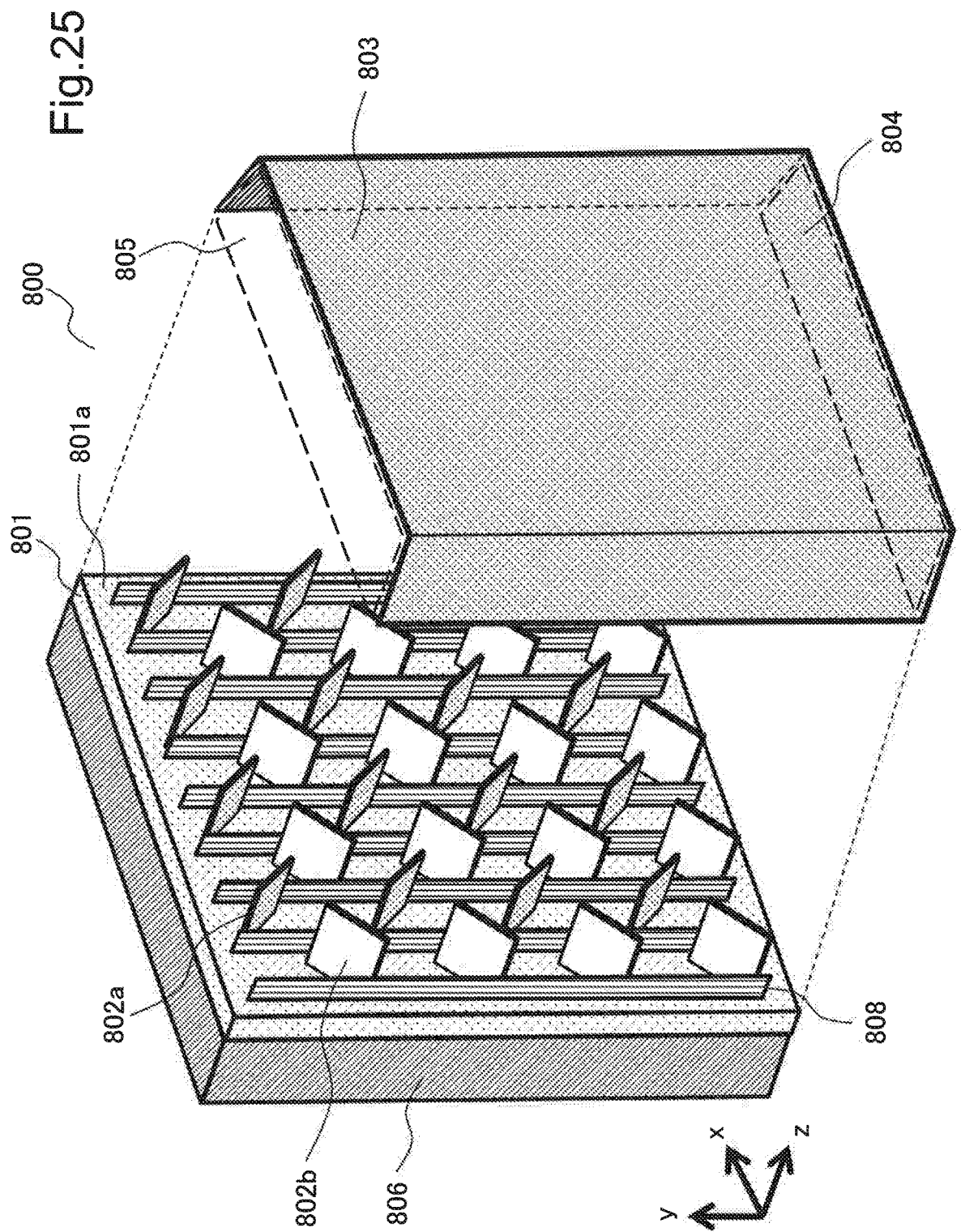
FIG. 25 is a diagram illustrating a modification example of the eighth example embodiment.

Further, in FIG. 24, a one-row polarization array configuration in the y-axis direction is illustrated. Alternatively, as illustrated in FIG. 25, an array configuration having two polarized waves perpendicular to each other may be employed. The wireless communication device 800 in FIG. 25 includes a first element group L1 disposed in a direction substantially perpendicular to the reflection surface 801a, and having a plurality of first antenna elements 802a. Further, the wireless communication device 800 in FIG. 25 includes a second element group L2 disposed in a direction substantially perpendicular to the reflection surface 801a, and having a plurality of second antenna elements 802b.

A plurality of the first antenna element 802a in the first element group L1 are disposed in a direction (first direction) inclined by about 45° with respect to the y-axis direction (vertical direction) on a flat plane including the y-axis and the z-axis on the reflection surface 801a. On the other hand, a plurality of the second antenna elements 802b in the second element group L2 are disposed in a direction (second direction) substantially perpendicular to the above-described first direction on a flat plane including the y-axis and the z-axis.

Further, the first antenna elements 802a are disposed in the first direction with an interval, and the second antenna elements 802b are disposed in the second direction with an interval. Further, the above-described first element group L1 is disposed in the second direction with an interval on the reflection surface 801a, and the second element group L2 is disposed in the first direction with an interval.

The plurality of first antenna elements 802a, and the plurality of second antenna elements 802b are disposed in a square grid pattern having same grid constants as each other. Specifically, intervals between the first antenna elements 802a adjacent to each other are substantially equal to each other, when viewed from a direction (z-axis direction) normal to the reflection surface 801a. Likewise, intervals between the second antenna elements 802b adjacent to each other are substantially equal to each other.

Each of the first antenna elements 802a is disposed between a pair of second antenna elements 802b adjacent to each other in the second direction. Further, a line connecting between a pair of second antenna elements 802b adjacent to each other, when viewed from a direction normal to the reflection plate 801 (reflection surface 801a) is configured to pass through a middle of the first antenna element 802a in the first direction. Herein, since the second antenna elements 802b are also disposed in a square grid pattern as described above, a line connecting between a pair of first antenna elements 802a adjacent to each other also passes through a middle of the second antenna element 802b in the second direction. Note that the above-described "middle" is not necessarily strictly a middle, and may be an area including a line segment which substantially equally divides the first antenna element 802a or the second antenna element 802b into two parts.

Since the first element group L1 and the second element group L2 are disposed in directions perpendicular to each other as described above, respective polarized waves thereof are also perpendicular to each other. Further, the first element group L1 and the second element group L2 are respectively individually controlled by the wireless communication circuit 807. Specifically, wireless signals of different phases and powers are respectively supplied to the first element group L1 and the second element group L2. According to this configuration, an array antenna constituted by the first element group L1 and the second element group L2 independently of each other is formed. Specifically, an array antenna is operated as a dual polarized array antenna capable of forming a beam different for each polarized wave.

Further, by disposing the first element group L1 and the second element group L2 as described above, directions in which radiation of an electromagnetic wave from the first antenna elements 802a and the second antenna elements 802b is maximized are perpendicular to each other. Therefore, it is possible to dispose the first antenna elements 802a and the second antenna elements 802b close to one another, while suppressing electromagnetic coupling between the first antenna elements 802a and the second antenna elements 802b.

In addition to the above, according to the above-described configuration, a gap to be formed by the first antenna elements 802a and the second antenna elements 802b is formed into a zig-zag shape along the y-axis. According to this configuration, since air flowing through the airflow passages 803F by natural convection sufficiently comes into contact with the first antenna elements 802a and the second antenna elements 802b, it is possible to further improve heat radiation performance of a wireless communication device 200.

Eleventh Modification Example of Eighth Example Embodiment

Figure 26:
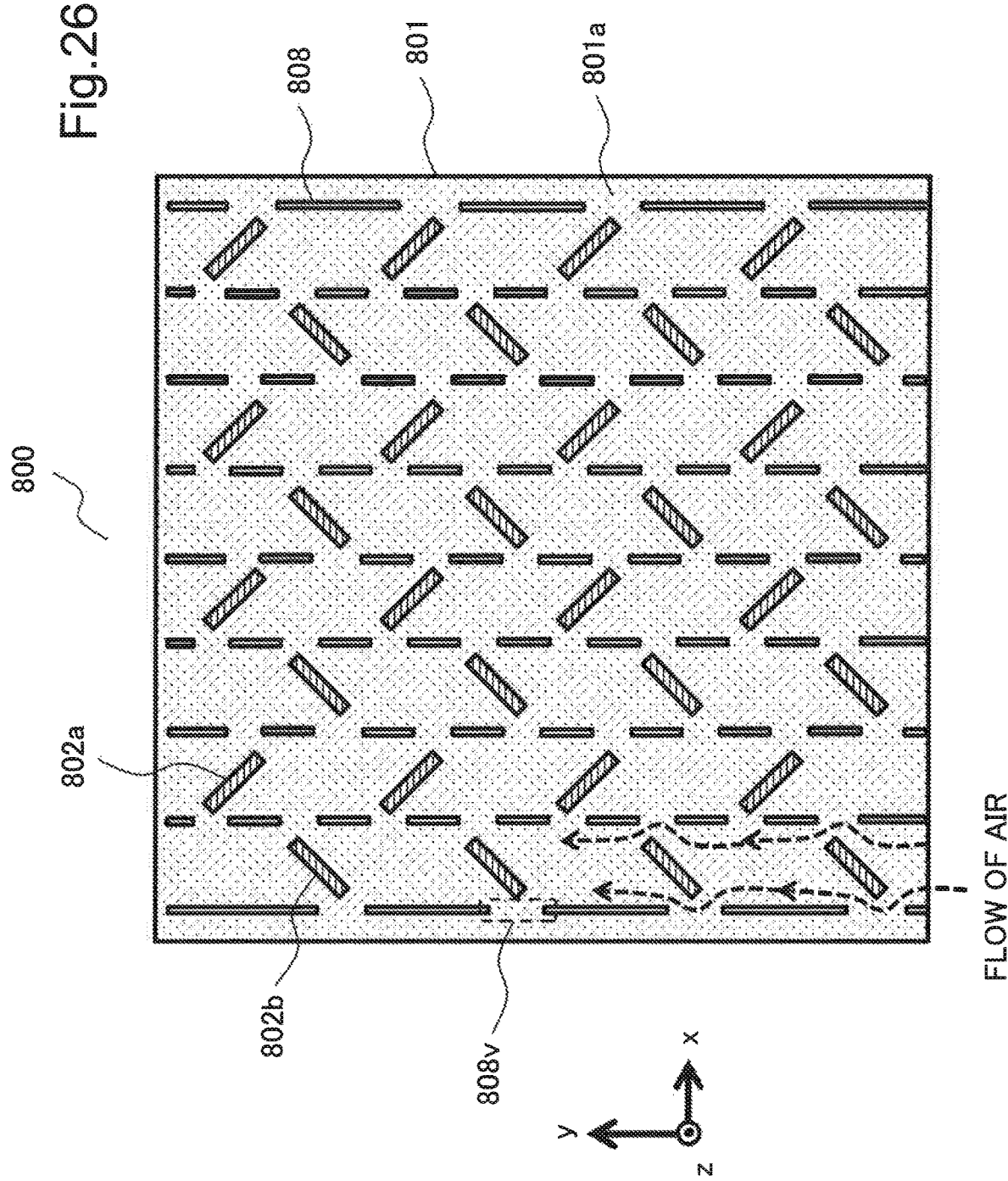
FIG. 26 is a diagram illustrating a modification example of the eighth example embodiment.

Further, for example, as illustrated in FIG. 26, a configuration in which a cutout 808v is formed in a position where an end portion of each of the first antenna element 802a and the second antenna element 802b, and the FSS heat radiation fin 808 come into close contact with each other may be proposed. Since a portion where air is less likely to flow is eliminated, and an air passage is secured by forming the cutout 808v, it is possible to improve heat radiation performance.

Twelfth Modification Example of Eighth Example Embodiment

Further, in FIG. 24, FIG. 25, and FIG. 26, an example in which the first antenna elements 802a and the second antenna elements 802b are respectively disposed in a square grid pattern is described. Alternatively, at least one of the first antenna elements 802a and the second antenna elements 802b may be disposed in a rectangular grid pattern.

Thirteenth Modification Example of Eighth Example Embodiment

Figure 29:
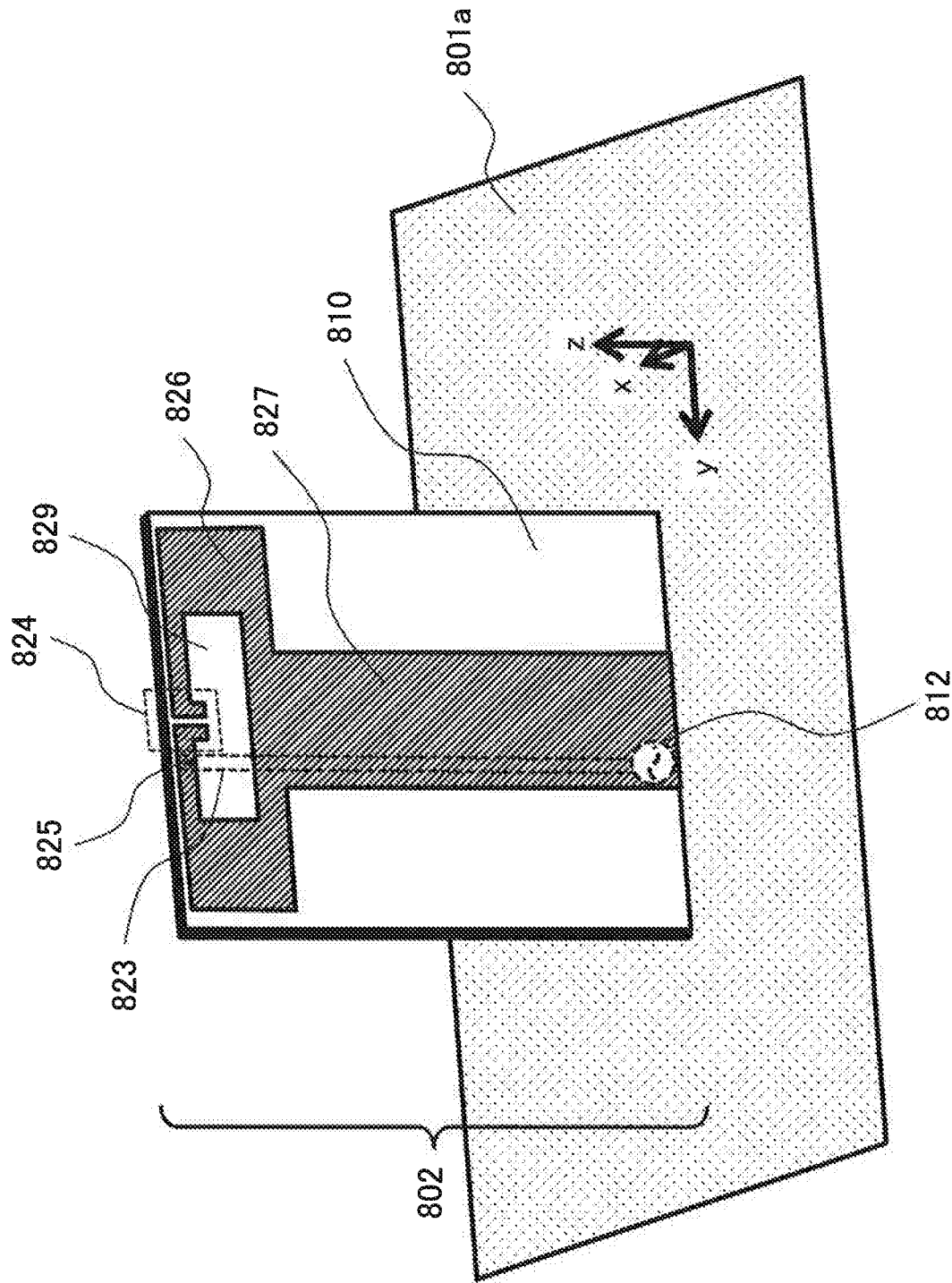
FIG. 29 is a diagram illustrating a modification example of the eighth example embodiment.
Figure 30:
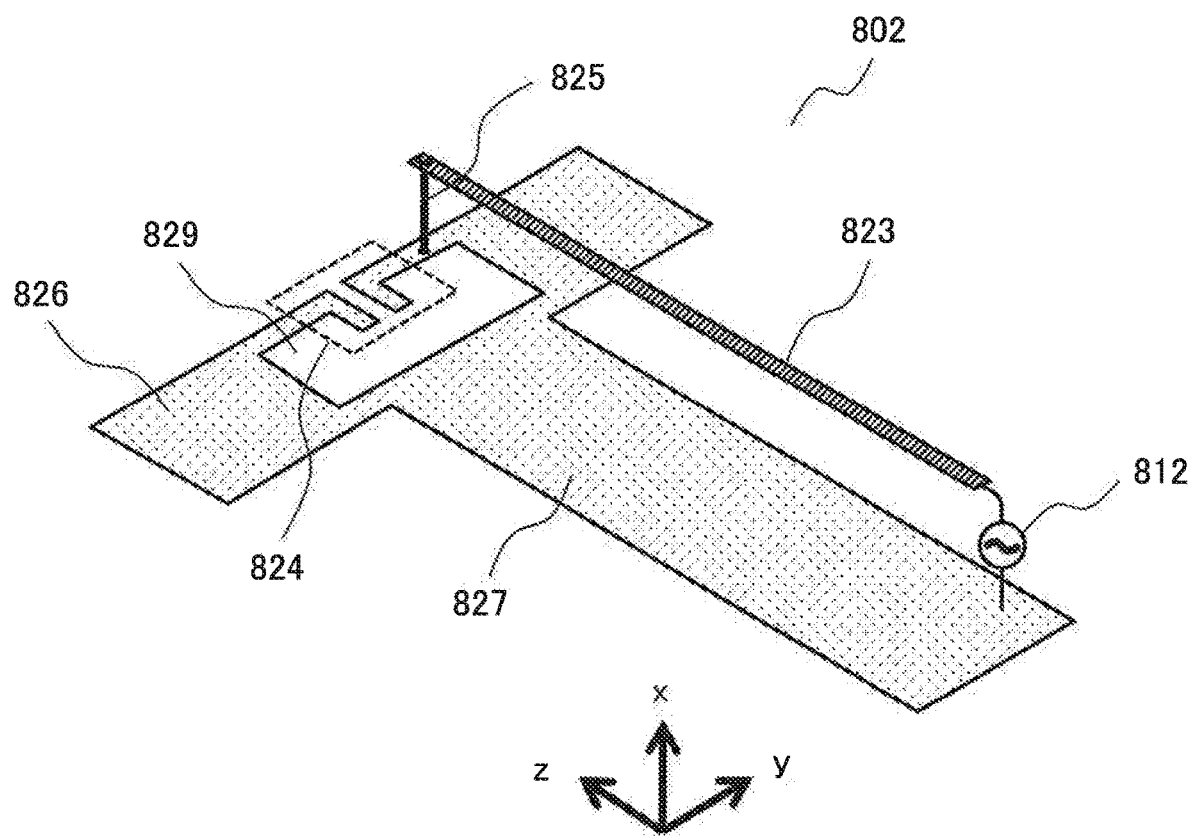
FIG. 30 is a diagram illustrating a modification example of the eighth example embodiment.

Further, in FIG. 24, FIG. 25, and FIG. 26, an example in which the antenna elements 802 (the first antenna element 802a and the second antenna element 802b) are respectively formed as dipole antennas is described. However, a configuration of the antenna element 802 is not limited to the above. As illustrated in FIG. 29 and FIG. 30, a so-called split-ring resonator may be employed as the antenna element 802.

Specifically, a substantially T-shaped conductive pattern is formed on an outer surface of the dielectric substrate 810. Out of the conductive pattern, an area close to the reflection plate 801 (reflection surface 801a) is referred to as a rectangular conductive portion 827, since the area has a substantially rectangular shape. On the other hand, an area away from the reflection surface 801a is referred to as an annular conductive portion 826, since the area has a substantially C-shape.

A split portion 824 in which a peripheral part of the annular conductive portion 826 is cut out is formed in the annular conductive portion 826. According to this configuration, the annular conductive portion 826 forms a magnetic field in a rectangular area 829 on an inner side thereof as an inductor, and the split portion 824 secures a predetermined electrostatic capacitance as a capacitor. According to the above-described configuration, a split-ring resonator in which an inductor and a capacitor are connected in series is formed.

Another peripheral part of the annular conductive portion 826 is connected to a power supply line 823 via a power supply via 825, so that a wireless signal to be transmitted from the power supply point 812 is input to the above-described split-ring resonator.

The antenna element 802 as a split-ring resonator as described above is able to reduce a size thereof, as compared with a dipole antenna of a same operating frequency. For example, comparison is made between a case that a split-ring resonator is employed as the antenna element 802 of the wireless communication device 800 in FIG. 25, and a case that a dipole antenna is employed. Then, it is possible to increase a gap to be formed by the first antenna element 802a and the second antenna element 802b, when a split-ring resonator is employed as the antenna element 802, as compared with a case that a dipole antenna is employed.

Therefore, it becomes possible to secure an array configuration in which airflow in the airflow passages 803F is not interfered, when a split-ring resonator is employed as the antenna element 802, as compared with a case that a dipole antenna is employed. According to this configuration, it is possible to more efficiently cool the wireless communication circuit 807.

Fourteenth Modification Example of Eighth Example Embodiment

Figure 31:
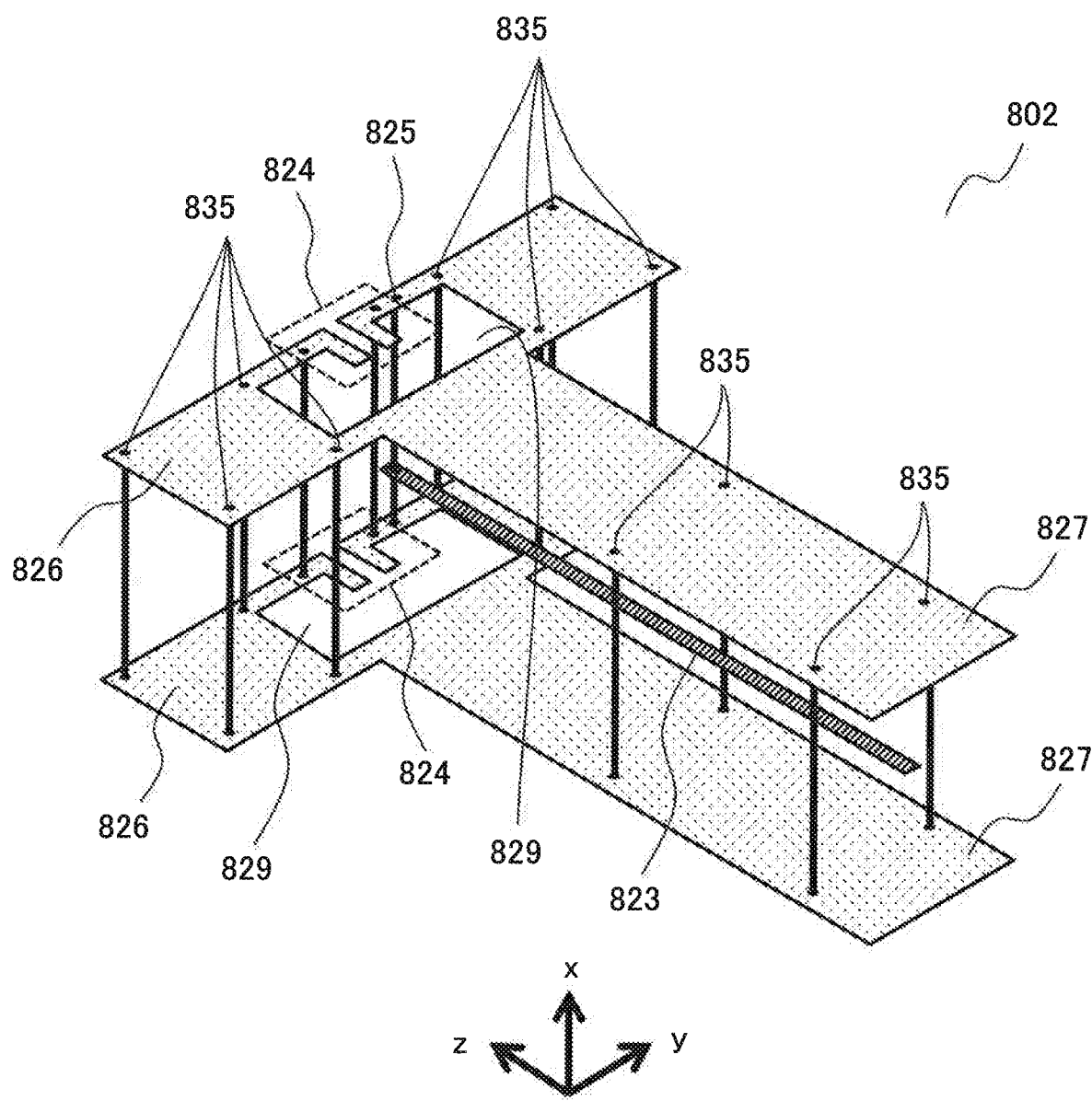
FIG. 31 is a diagram illustrating a modification example of the eighth example embodiment.

Further, as illustrated in FIG. 31, a plurality of the substantially T-shaped conductive patterns in FIG. 30 may be laminated, the substantially T-shaped conductive patterns are connected to each other by conductive vias 835, and the power supply line 823 may be provided between the substantially T-shaped conductive patterns. According to this configuration, it is possible to improve shielding performance against the power supply line 823 by the rectangular conductive portions 827 facing each other. Specifically, it is possible to shield external noise against the power supply line 823.

Fifteenth Modification Example of Eighth Example Embodiment

Further, the above-described antenna element 802 in FIG. 24, FIG. 25, and FIG. 26 is also applicable to the wireless communication device 500 in the fifth example embodiment, the wireless communication device 600 in the sixth example embodiment, and the radar device 700 in the seventh example embodiment.

Note that, in the eighth example embodiment and the respective modification examples of the eighth example embodiment, a case that a frequency selective plate described in the first example embodiment is employed as a frequency selective plate is described. Alternatively, a frequency selective plate described in other example embodiments may be employed.

Ninth Example Embodiment

Next, a ninth example embodiment is described with reference to FIG. 9.

Figure 9:
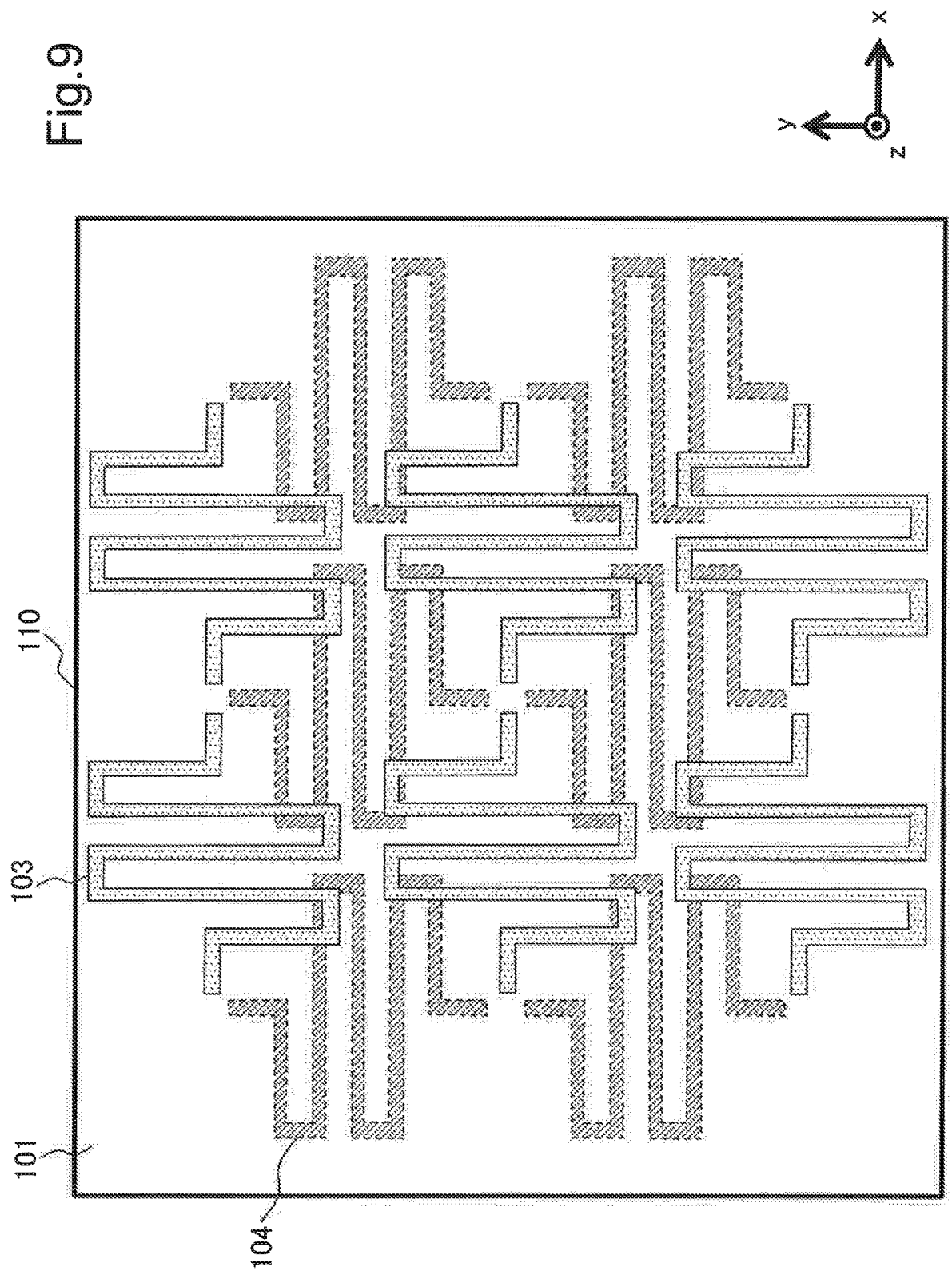
FIG. 9 is a diagram illustrating a configuration example of a ninth example embodiment.

FIG. 9 is a top plan view illustrating a configuration of a wavelength selective plate 110 in the present example embodiment.

In a configuration of the frequency selective plate 100 in the first example embodiment illustrated in FIG. 1 and FIG. 2, four conductive vias 102, two conductive patterns 103, and two conductive patterns 104 are electrically connected, and a conductive loop is formed. A frequency selective plate of a structure in which a part of the conductive loop is cut out may be proposed.

For example, in the frequency selective plate 110 illustrated in FIG. 9, all conductive vias 102 are removed, and respective conductive patterns 103 and conductive patterns 104 are electrically away from one another. In this case, an electromagnetic wave incident to the frequency selective plate 110 is reflected as an incident electromagnetic wave at an electrical resonant frequency of the conductive pattern 103, and at an electrical resonant frequency of the conductive pattern 104. Further, an electromagnetic wave incident to the frequency selective plate 110 is transmitted at a frequency away from each of the electrical resonant frequency of the conductive pattern 103, and the electrical resonant frequency of the conductive pattern 104.

Tenth Example Embodiment

Next, a tenth example embodiment is described with reference to FIG. 34.

Figure 34:
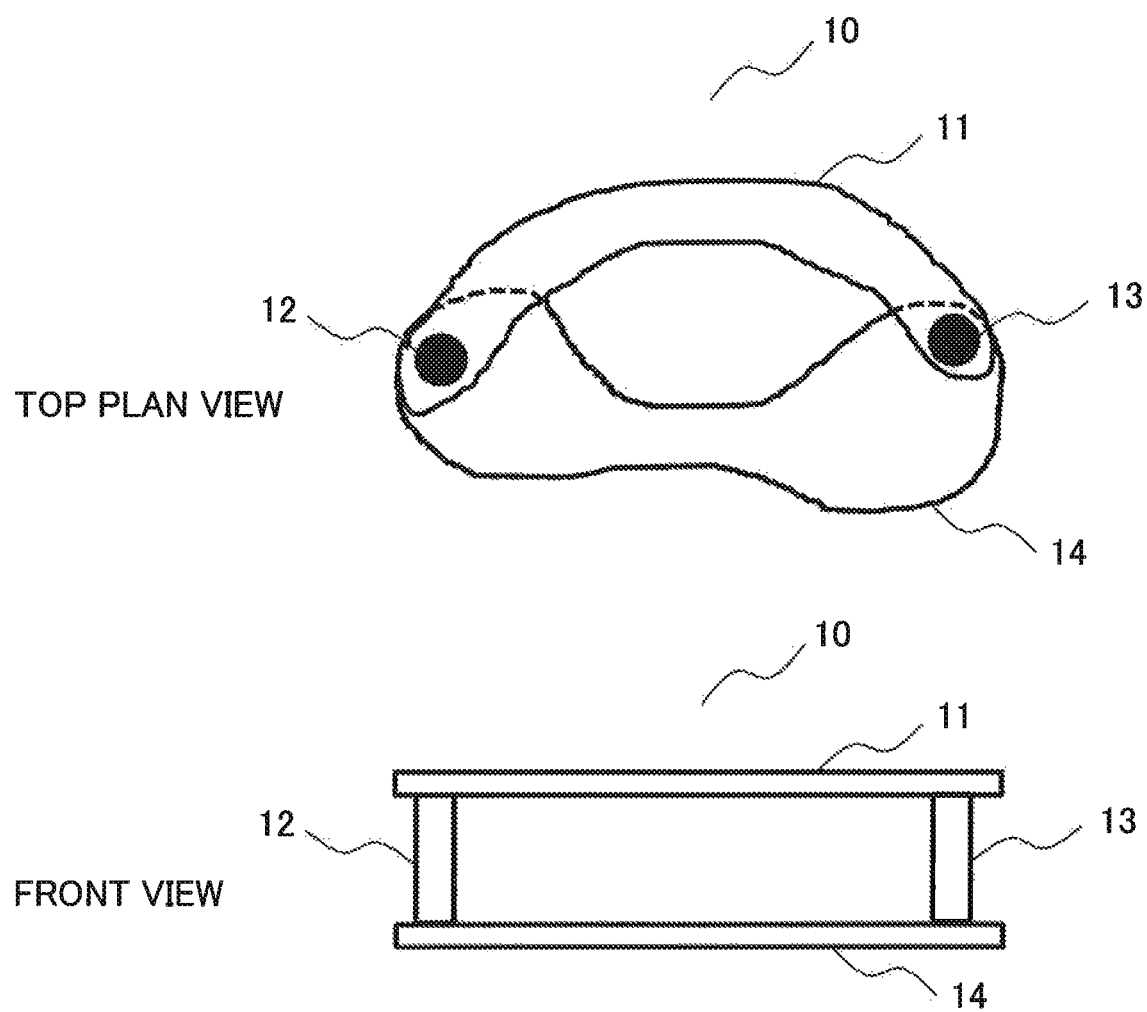
FIG. 34 is a diagram illustrating a configuration example of a tenth example embodiment.

FIG. 34 is a diagram illustrating a configuration example of the present example embodiment.

A frequency selective plate 10 in the present example embodiment is a frequency selective plate for transmitting an electromagnetic wave of a predetermined frequency, and reflecting an electromagnetic wave of a frequency other than the predetermined frequency. Further, the frequency selective plate 10 includes at least one or more conductive closed loops. The conductive closed loop is configured such that a conductive pattern 11 formed on one layer, and a conductive pattern 14 to be formed on at least one layer different from the one layer 11 are electrically connected by a connecting portion 12 and a connecting portion 13.

As described above, the frequency selective plate 10 in the present example embodiment is designable in any shape and size, as compared with a frequency selective plate as described in PTL 1 by miniaturization of an operating unit cell, and a continuous layout of operating unit cells.

A part or an entirety of the above-described example embodiments may be described as the following supplementary notes, but are not limited to the following.

(Supplementary Note 1)

A frequency selective plate for transmitting an electromagnetic wave of a predetermined frequency, and reflecting an electromagnetic wave of a frequency other than the predetermined frequency, wherein the frequency selective plate includes at least one or more conductive closed loops configured such that a conductive pattern formed on one layer, and a conductive pattern to be formed on at least one layer different from the one layer are electrically connected by a connecting portion.

(Supplementary Note 2)

The frequency selective plate according to supplementary note 1, wherein orthogonal projections of at least two conductive patterns with respect to a surface where the one layer is formed among the conductive patterns at least partially overlap at a position other than the connecting portion.

(Supplementary Note 3)

The frequency selective plate according to supplementary note 1 or 2, wherein a shortest length between the connecting portions of the at least one conductive pattern is longer than a shortest distance between the connecting portions.

(Supplementary Note 4)

The frequency selective plate according to any one of supplementary notes 1 to 3, wherein at least one of the conductive patterns has a meander shape.

(Supplementary Note 5)

The frequency selective plate according to any one of supplementary notes 1 to 4, wherein the one layer, and a layer different from the one layer are disposed to face each other with a dielectric layer of a printed circuit substrate being interposed, and the connecting portion is a conductive via.

(Supplementary Note 6)

A frequency selective plate including at least one or more conductive closed loops having a conductive pattern of a meander shape formed on one layer.

(Supplementary Note 7)

The frequency selective plate according to any one of supplementary notes 1 to 6, further including a plurality of the conductive closed loops, wherein a part of the conductive closed loop is connected to another one of the conductive closed loops.

(Supplementary Note 8)

The frequency selective plate according to any one of supplementary notes 1 to 7, wherein a gap is formed in at least one position of the conductive closed loop, and a capacitance element is disposed between conductive members with the gap being interposed.

(Supplementary Note 9)

A frequency selective plate for transmitting an electromagnetic wave of a predetermined frequency, and reflecting an electromagnetic wave of a frequency other than the predetermined frequency, wherein the frequency selective plate includes at least one or more loops constituted by a conductive pattern formed on one layer, a conductive pattern to be formed on at least one layer different from the one layer, and a gap between end portions of the conductive patterns.

(Supplementary Note 10)

The frequency selective plate according to supplementary note 9, wherein orthogonal projections of at least two conductive patterns with respect to a surface where the one layer is formed among the conductive patterns at least partially overlap.

(Supplementary Note 11)

The frequency selective plate according to supplementary note 9 or 10, wherein a shortest length between end portions of the at least one conductive pattern on the at least one conductive pattern is longer than a shortest distance between end portions of the at least one conductive pattern.

(Supplementary Note 12)

The frequency selective plate according to any one of supplementary notes 9 to 11, wherein at least one of the conductive patterns has a meander shape.

(Supplementary Note 13)

The frequency selective plate according to any one of supplementary notes 9 to 12, wherein the one layer, and a layer different from the one layer are disposed to face each other with a dielectric layer of a printed circuit substrate being interposed.

(Supplementary Note 14)

The frequency selective plate according to any one of supplementary notes 9 to 13, further including a plurality of the loops, wherein a part of the loop is proximate to another one of the loops with a gap being interposed.

(Supplementary Note 15)

The frequency selective plate according to any one of supplementary notes 9 to 14, wherein a second gap is formed in at least one position of the loop, and a capacitance element is disposed between conductive members with the second gap being interposed.

(Supplementary Note 16)

An antenna including at least a part of a radome for covering at least one antenna element is the frequency selective plate according to any one of supplementary notes 1 to 15.

(Supplementary Note 17)

An antenna including:

a reflection plate for reflecting an electromagnetic wave; and at least one frequency selective plate according to any one of supplementary notes 1 to 15 disposed substantially perpendicular to the reflection plate.

(Supplementary Note 18)

The antenna according to supplementary note 17, wherein at least one of the conductive patterns of the frequency selective plate is directly connected to the reflection plate, or is connected by a material having thermal conductivity.

(Supplementary Note 19)

An antenna including:

a reflection plate for reflecting an electromagnetic wave;

at least one first antenna element disposed at a first predetermined height with respect to a top surface of the reflection plate;

the frequency selective plate according to any one of supplementary notes 1 to 15 disposed above the first antenna element; and at least one second antenna element disposed at a second predetermined height with respect to a top surface of the frequency selective plate and configured to operate at a frequency higher than a frequency of the first antenna element, wherein the predetermined frequency is an operating frequency of the first antenna element.

(Supplementary Note 20)

The antenna according to supplementary note 19, wherein the first predetermined height is equal to substantially one-fourth of a wavelength associated with an operating frequency of the first antenna element, and the second predetermined height is equal to substantially one-fourth of a wavelength associated with an operating frequency of the second antenna element.

(Supplementary Note 21)

A wireless communication device including:

the antenna according to any one of supplementary notes 16 to 20; and a wireless communication circuit.

(Supplementary Note 22)

A radar device including:

the antenna according to any one of supplementary notes 16 to 20; and a radar electronic circuit.

In the foregoing, the present invention is described by using the above-described example embodiments as exemplary examples. The present invention, however, is not limited to the above-described example embodiments. Specifically, the present invention is applicable to various aspects comprehensible to a person skilled in the art within the scope of the present invention.

This application claims the priority based on Japanese Patent Application No. 2016-028552 filed on Feb. 18, 2016, the disclosure of which is incorporated herein in its entirety.

REFERENCE SIGNS LIST

10 Frequency selective plate
11 Conductive pattern
12, 13 Connecting portion
14 Conductive pattern
100 Frequency selective plate
101 Dielectric substrate
102 Conductive via
102R Antenna array
103, 104, 105 Conductive pattern
106 Conductive loop
108 FSS heat radiation fin
110 Frequency selective plate
200 Wireless communication device
201, 202 Branch conductive pattern
203, 204 Capacitor
205 Overlapping portion
301, 302, 303, 304 Conductive pattern
401, 402 Conductive via
403, 404, 405 Conductive pattern
406, 407 Conductive via
408, 409, 410 Conductive pattern
500 Wireless communication device
510 Multi-band antenna
520 Conductive reflection plate
600 Wireless communication device
601 First antenna element
602 Second antenna element
603 Conductive reflection plate
605, 606 Power supply line
607 Opening
700 Radar device
710 Antenna array
720 Conductive reflection plate
800 Wireless communication device
801 Reflection plate
801a Reflection surface
802 Antenna element
802a First antenna element
802b Second antenna element
803 Radome
803F Air passage 804 Air suction hole
805 Air discharge hole
806 Housing portion
807 Wireless communication circuit
808 FSS heat radiation fin
808v Cutout
810 Dielectric substrate
811a, 811b Antenna pattern
812 Power supply point
823 Power supply line
824 Split portion
825 Power supply via
826 Annular conductive portion
827 Rectangular conductive portion
829 Rectangular area
835 Conductive via

What is claimed is:

1. A frequency selective plate for transmitting an electromagnetic wave of a predetermined frequency, and reflecting an electromagnetic wave of a frequency other than the predetermined frequency, the frequency selective plate comprising
at least one or more conductive closed loops configured in such a way that a first conductive pattern formed on one layer, and a second conductive pattern to be formed on at least one layer different from the one layer are electrically connected by a connecting portion.

2. The frequency selective plate according to claim 1, further comprising
orthogonal projections of at least two conductive patterns with respect to a surface where the one layer is formed among the conductive patterns at least partially overlap at a position other than the connecting portion.

3. The frequency selective plate according to claim 1, further comprising
a shortest length between the connecting portions of the at least one conductive pattern is longer than a shortest distance between the connecting portions.

4. The frequency selective plate according to claim 1, wherein
at least one of the conductive patterns has a meander shape.

5. The frequency selective plate according to claim 1, wherein
the one layer, and a layer different from the one layer are disposed to face each other with a dielectric layer of a printed circuit substrate being interposed, and
the connecting portion is a conductive via.

6. The frequency selective plate according to claim 1, further comprising
a plurality of the conductive closed loops, wherein
a part of the conductive closed loop is connected to another of the conductive closed loops.

7. The frequency selective plate according to claim 1, further comprising
a gap is formed in at least one position of the conductive closed loop, and
a capacitance element is disposed between conductive members with the gap being interposed.

8. An antenna comprising
at least a part of a radome covering at least one antenna element is the frequency selective plate according to claim 1.

9. An antenna comprising:
a reflection plate for reflecting an electromagnetic wave; and
at least one of the frequency selective plate according to claim 1, being disposed substantially perpendicular to the reflection plate.

10. The antenna according to claim 9, wherein
at least one of the conductive patterns of the frequency selective plate is directly connected to the reflection plate, or is connected by a material having thermal conductivity to the reflection plate.

11. An antenna comprising:
a reflection plate for reflecting an electromagnetic wave;
at least one first antenna element being disposed at a first predetermined height with respect to a top surface of the reflection plate;
the frequency selective plate according to claim 1, being disposed above the first antenna element; and
at least one second antenna element being disposed at a second predetermined height with respect to a top surface of the frequency selective plate and being configured to operate at a frequency higher than a frequency of the first antenna element, wherein
the predetermined frequency is an operating frequency of the first antenna element.

12. The antenna according to claim 11, wherein
the first predetermined height is equal to substantially one-fourth of a wavelength associated with an operating frequency of the first antenna element, and
the second predetermined height is equal to substantially one-fourth of a wavelength associated with an operating frequency of the second antenna element.

13. A frequency selective plate for transmitting an electromagnetic wave of a predetermined frequency, and reflecting an electromagnetic wave of a frequency other than the predetermined frequency, the frequency selective plate comprising
at least one or more loops constituted by a conductive pattern formed on one layer, a conductive pattern to be formed on at least one layer different from the one layer, and a gap between end portions of the conductive patterns.

14. The frequency selective plate according to claim 13, further comprising
orthogonal projections of at least two conductive patterns with respect to a surface where the one layer is formed among the conductive patterns at least partially overlap.

15. The frequency selective plate according to claim 13, further comprising
a shortest length between end portions of the at least one conductive pattern on the at least one conductive pattern is longer than a shortest distance between end portions of the at least one conductive pattern.

16. The frequency selective plate according to claim 13, wherein
at least one of the conductive patterns has a meander shape.

17. The frequency selective plate according to claim 13, wherein
the one layer, and a layer different from the one layer are disposed to face each other with a dielectric layer of a printed circuit substrate being interposed.

18. The frequency selective plate according to claim 13, further comprising
a plurality of the loops, wherein
a part of the loop is proximate to another of the loops with a gap being interposed.

19. The frequency selective plate according to claim 13, further comprising a second gap is formed in at least one position of the loop, and a capacitance element is disposed between conductive members with the second gap being interposed.

* * * * *